US008566789B2

(12) United States Patent
Siddaramappa et al.

(10) Patent No.: US 8,566,789 B2
(45) Date of Patent: Oct. 22, 2013

(54) SEMANTIC-BASED QUERY TECHNIQUES FOR SOURCE CODE

(75) Inventors: Nagaraja Nanjegowda Siddaramappa, Bangalore (IN); Renuka Sindhgatta, Bangalore (IN); Santonu Sarkar, Bangalore (IN); Srinivas Thonse, Bangalore (IN); Krishnakumar Pooloth, Bangalore (IN)

(73) Assignee: Infosys Limited, Bangalore (IN)

( * ) Notice: Subject to any disclaimer, the term of this patent is extended or adjusted under 35 U.S.C. 154(b) by 1802 days.

(21) Appl. No.: 11/466,740

(22) Filed: Aug. 23, 2006

(65) Prior Publication Data

US 2007/0050343 A1  Mar. 1, 2007

(30) Foreign Application Priority Data

Feb. 25, 2006  (IN) .......................... 1172/CHE/2005

(51) Int. Cl.
*G06F 9/44* (2006.01)
*G06F 7/00* (2006.01)

(52) U.S. Cl.
USPC ........... 717/110; 707/706; 707/708; 707/755; 707/765; 707/769; 707/771; 707/775

(58) Field of Classification Search
None
See application file for complete search history.

(56) References Cited

U.S. PATENT DOCUMENTS

| | | | | |
|---|---|---|---|---|
| 4,931,928 | A * | 6/1990 | Greenfeld | 717/131 |
| 5,778,362 | A * | 7/1998 | Deerwester | 1/1 |
| 5,940,821 | A * | 8/1999 | Wical | 1/1 |
| 6,094,650 | A | 7/2000 | Stoffel et al. | |
| 7,099,885 | B2 * | 8/2006 | Hellman et al. | 1/1 |
| 2002/0023257 | A1 * | 2/2002 | Charisius et al. | 717/2 |
| 2002/0173971 | A1 | 11/2002 | Stirpe et al. | |
| 2002/0198873 | A1 * | 12/2002 | Chu-Carroll | 707/3 |
| 2003/0101170 | A1 | 5/2003 | Edelstein et al. | |
| 2003/0196192 | A1 * | 10/2003 | Barclay et al. | 717/128 |
| 2005/0289119 | A1 * | 12/2005 | Weinberg et al. | 707/2 |
| 2006/0015843 | A1 * | 1/2006 | Sabbouh | 717/106 |
| 2006/0026013 | A1 * | 2/2006 | Kraft | 705/1 |
| 2007/0130180 | A1 * | 6/2007 | Rasmussen | 707/100 |

OTHER PUBLICATIONS

Janzen et al. Navigating and querying code without getting lost. [online] (Mar. 2003). ACM, Proceedings of the $2^{nd}$ international conference on Aspect-oriented software development, pp. 178-187. Retrieved From the Internet <http://portal.acm.org/citation.cfm?id=643622>.*

Dinkelacker et al., "Progressive Open Source," *In Proc. of the $24^{th}$ International Conference on Software Engineering*, 2002, pp. 177-184, 8 pages.

(Continued)

*Primary Examiner* — Insun Kang
(74) *Attorney, Agent, or Firm* — Klarquist Sparkman, LLP

(57) ABSTRACT

A powerful set of features can assist software developers in searching source code. Source code can be queried to find occurrences of source code elements mapped to domain concepts appearing in an ontology. Queries can specify a search for occurrences of particular operations performed on domain concepts within the source code. Query expansion can be used to locate related domain concepts as indicated in the ontology. Query keyword weighting can be used to emphasize one domain concept over another. Tools can be provided to create the ontology and associate the ontology with the elements appearing in the source code. Results can include user interface features assisting in navigation to a location within the source code associated with the query results.

21 Claims, 45 Drawing Sheets

(56) References Cited

OTHER PUBLICATIONS

"Document-term matrix," Wikipedia, visited Aug. 16, 2006, 2 pages. http://en.wikipedia.org/wiki/Document-term_matrix.
"Eclipse Platform Technical Overview," from www.eclipse.org, visited Aug. 8, 2006, 19 pages.
Eztkorn, "A Metrics-Based Approach to the Automated Identification of Object-Oriented Reusable Software Components," A Dissertation, University of Alabama, 1997, 297 pages.
Frakes et al., "Software Reuse through Information Retrieval," SIGIR Forum, vol. 21, 1987, 7 pages.
G. et al., "SAM: A Tool for Software Architecture Modeling and Performance Analysis," *Proc. of the 2nd International Conference on the Quantitative Evaluation of Systems (QEST'05)* 2005, 2 pages.
Henninger et al., "An Ontology-Based Metamodel for Software Patterns," University of Nebraska-Lincoln, Computer Science and Eng., Mar. 2006, 6 pages.
Henninger, "Retrieving Software Objects in an Example-Based Programming Environment," *Proc. of the 14th International Conference on Research and Development in Information Retrieval*, 1991, pp. 251-260, 10 pages.
Holmes et al., "Using Structural Context to Recommend Source Code Examples," *Proc. of International Conference on Software Engineering*, 2005, pp. 117-125, 9 pages.
Janzen et al., "Navigating and Querying Code Without Getting Lost," *Proc. of the 2nd International Conference on Aspectoriented Software Development*, 2003, pp. 178-187, 10 pages.
Kim, "Predicting How Ontologies for the Semantic Web Will Evolve," *Communications of the ACM*, vol. 45, No. 2, Feb. 2002, pp. 48-54, 7 pages.
Mandelin et al., "Jungloid Mining: Helping to Navigate the API Jungle," *Proc. of PLDI*, 2005, pp. 48-61, 14 pages.

Noy et al., "Ontology Development 101: A Guide to Creating Your First Ontology," Stanford University, from protege.standford.edu, visited Aug. 9, 2006, 25 pages.
Papadimitriou et al., "Latent Semantic Indexing: A Probabilistic Analysis," *Proc. of the 17th ACM SIGACTSIGMODSIGART*, 1998, 18 pages.
Paul et al., "Querying Source Code using an Algebraic Query Language," *Proc. of the International Conference on Software Maintenance* (ICSM 1994), pp. 127-136, 10 pages.
Sarkar et al., "EAML—Architecture Modeling Language for Enterprise Applications," *Proc. of the E-commerce Technology for Dynamic E-Business, IEEE International Conference on (CEC-East'04)* 2004, 8 pages.
Sarkar et al., "Metrics for Analyzing Module Interactions in Large Software Systems," *Proc. of the 12th Asia-Pacific Software Engineering Conference (APSEC'05)* 2005, 8 pages.
"Semantic Web," Wikipedia, visited Aug. 16, 2006, 5 pages. http://en.wikipedia.org/wiki/Semantic_Web.
Sugumaran et al., "A Semantic-Based Approach to Component Retrieval," *The Data Base for Advances in Information Systems*, vol. 34, No. 3, Summer 2003, pp. 8-24, 17 pages.
Yao et al., "Towards a Semantic-Based Approach for Software Reusable Component Classification and Retrieval," ACMSE'04, 2004, pp. 110-115, 6 pages.
Ye et al., "Supporting Reuse by Delivering Task-Relevant and Personalized Information," *Proc. of 24th International Conference on Software Engineering*, 2002, pp. 513-523. 11 pages.
Zangjian et al., "Research of a Semantic-Based Approach to Improve Software Component Reuse," *Proc. of the 1st International Conference on Semantics, Knowledge and Grid* (SKG'05), Nov. 2005, 3 pages.
Zimmer, "Tuna: Ontology-Based Source Code Navigation and Annotation," *Proc. of OOPSLA Wsh. Ontologies as Software Engineering Artifacts*, 2004, 9 pages.

\* cited by examiner

```
QUERY
<OPERATION/CONTAINS> <DOMAIN CONCEPT(S)>
```

```
COMPOUND QUERY
<QUERY>  <LOGICAL OPERATOR> <QUERY>
```

```
COMPOUND QUERY
<OPERATION-1> <DOMAIN CONCEPT(S)-1>
<LOGICAL OPERATOR> <OPERATION-2> <DOMAIN CONCEPT(S)-2>
```

| FILE NAME | COMPONENT | METHOD | SCORE | MATCHING FIELDS |
|---|---|---|---|---|
| ..\SRC\XYZ.JAVA | ORDERAPPROVAL | ADDORDER | 78% | USES, READS |
| ..\SRC\ABC.JAVA | STOREPROXY | GETORDERS | 70% | USES, UPDATES |

RESULTS

FIG. 35

```
/*
 * @author santonu_sarkar
 */
public class OrderFulFillment {
    private TPAInvoice invoice;
    private TPASupplierOrder supplierOrder;
    private SupplierOrder mysupplierOrder;
    private Inventory invHome;
    /**
     * Tries to fullfill an order with items in inventory
     */
    private String processAnOrder(SupplierOrder po) throws XMLDocumentException {
        boolean allItemsAvailable = true;
        boolean invoiceReqd = false;
        String invoiceXml = null;
        HashMap items = new HashMap();
        Collection liColl = po.getLineItems();
        Iterator liIt = liColl.iterator();
        while((liIt != null) && (liIt.hasNext())) {
            LineItemLocal li = (LineItemLocal) liIt.next();
            if(li.getQuantity() == li.getQuantityShipped())
                continue;
            if(!checkInventory(li)) {
                allItemsAvailable = false;
                continue;
            }
            li.setQuantityShipped(li.getQuantity());
            items.put(li.getItemId(), OrderStatusNames.COMPLETED);
            invoiceReqd = true;
        }//end while
        if(allItemsAvailable)
            po.setPoStatus(OrderStatusNames.COMPLETED);
        if(invoiceReqd) {
            try {
```

```
@SUMMARY
@uses  LineItem, SupplierOrder, Order
@performs update LineItem, update SupplierOrder
@involved-in OrderFulFillment
@element module OrderFulfillment,
service processAnOrder
@Line# 90 @File OrderFulfillment.java
@DETAIL FLOW
get LineItems of PurchaseOrder
iterate LineItems
check LineItems.Quantity equals LineItems.ShippedQuantity
     .....
```

```
@SUMMARY
@uses  LineItem, Inventory
@performs update Inventory
@involved-in OrderFulFillment
@element module OrderFulfillment,service checkInventory
@Line# 172 @File OrderFulfillment.java
@DETAIL FLOW
get Inventory for LineItem
check Inventory.Quantity isGreater LineItem.Quantity
update Inventory
     .....
```

FIG. 39

SEMANTIC-BASED QUERY TECHNIQUES FOR SOURCE CODE

BACKGROUND

Maintaining a large legacy software system is notoriously difficult. Such systems can be critical to continued operation of a business, but they are often pieced together by scores of different programmers over a period of years. The result is a system with millions of lines of code and little relevant documentation. The original developers often move on to other projects, and waves of successors have edited, extended, and enhanced the software system using a variety of technologies and techniques.

All software must evolve over time to meet change, and legacy systems are no exception. However, a seemingly simple change to a legacy software system can become a monumental effort. Even if a top-notch programming team is put to task, it can take an enormous effort to decipher the structure and operation of the system.

Software development environments do offer tools for helping a programming team deal with a legacy system. For example, searching mechanisms can be employed to find every occurrence of a keyword in the source code. So, if a change is going to be made, the full impact can be investigated. Careful searching can reveal much about how the software operates. However, simple keyword searching, even in the hands of an expert, has severe limitations. In many cases, too few or too many keyword hits are found, limiting the usefulness of current search tools. So, improvements to the tools are sorely needed.

SUMMARY

A variety of semantic-based query techniques can be used as powerful tools for searching source code. A query can contain domain concept names and query processing can find occurrences within the source code where source code elements mapped to the domain concept names appear. Operations for the domain concept names can be specified. If so, query processing can find occurrences within the source code where the operations are performed on the source code elements mapped to the domain concept names. Compound queries can be supported. Code semantics descriptors can be used to assist query processing.

Query results can indicate found occurrences within the source code and provide useful features, such as a hyperlink to the found location within the source code.

An ontology tailored to the particular problem domain at issue can be employed. For example, source code elements can be mapped to domain concept names in the ontology. The ontology can also be used to expand a query to find relevant results that otherwise would be missed.

The semantic-based query techniques can open a new world of query functionality. For example, occurrences of domain concepts can be found by a developer familiar with the problem domain even if the original programmers chose different names from those appearing in the ontology. And, a variety of query features allow a skillful searcher to pinpoint particular phenomena within the source code while avoiding unwanted hits.

The foregoing and other features and advantages will become more apparent from the following detailed description of disclosed embodiments, which proceeds with reference to the accompanying drawings.

BRIEF DESCRIPTION OF THE FIGURES

FIGS. 26A-C show exemplary queries for use in semantic searching techniques.

FIG. 35 is a block diagram of an exemplary user interface for presenting query results.

FIG. 38 is an exemplary snippet of source code having source code elements that can be mapped to domain concepts appearing in an ontology, such as that shown in FIG. 37.

FIGS. 39A-B are data structures showing exemplary code semantics descriptors.

DETAILED DESCRIPTION

EXAMPLE 1

Exemplary System Employing a Combination of the Technologies

Figure 1:
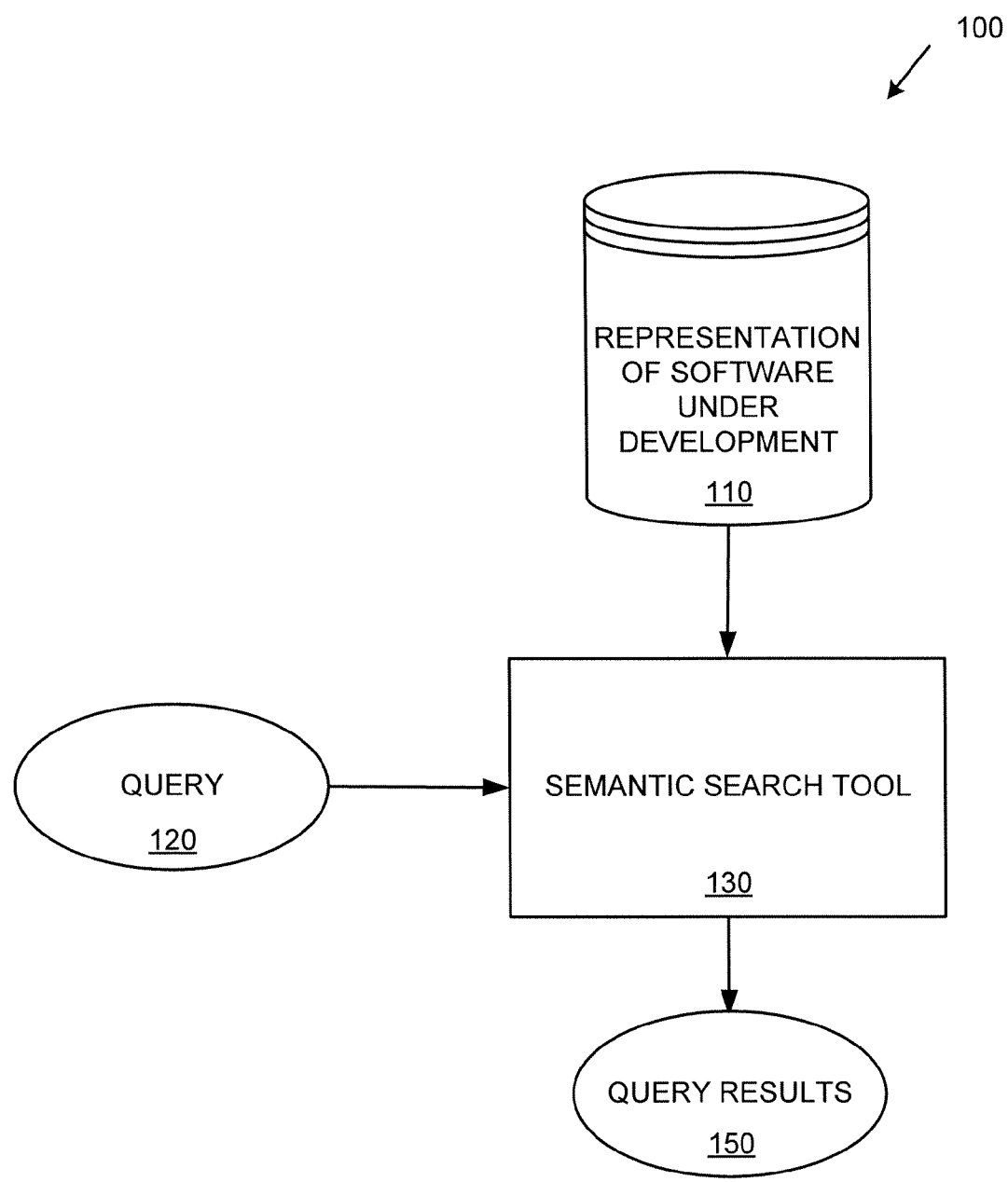
FIG. 1 is a block diagram of an exemplary semantic-based querying system.

FIG. 1 is a block diagram of an exemplary semantic-based querying system 100 that can be configured to include any combination of the technologies described herein. Such a system 100 can be provided separately or as part of a software development environment.

In the example, a representation 110 of software under development is input into a semantic search tool 130, which generates query results 150 based at least on the query 120.

EXAMPLE 2

Exemplary Method Employing a Combination of the Technologies

Figure 2:
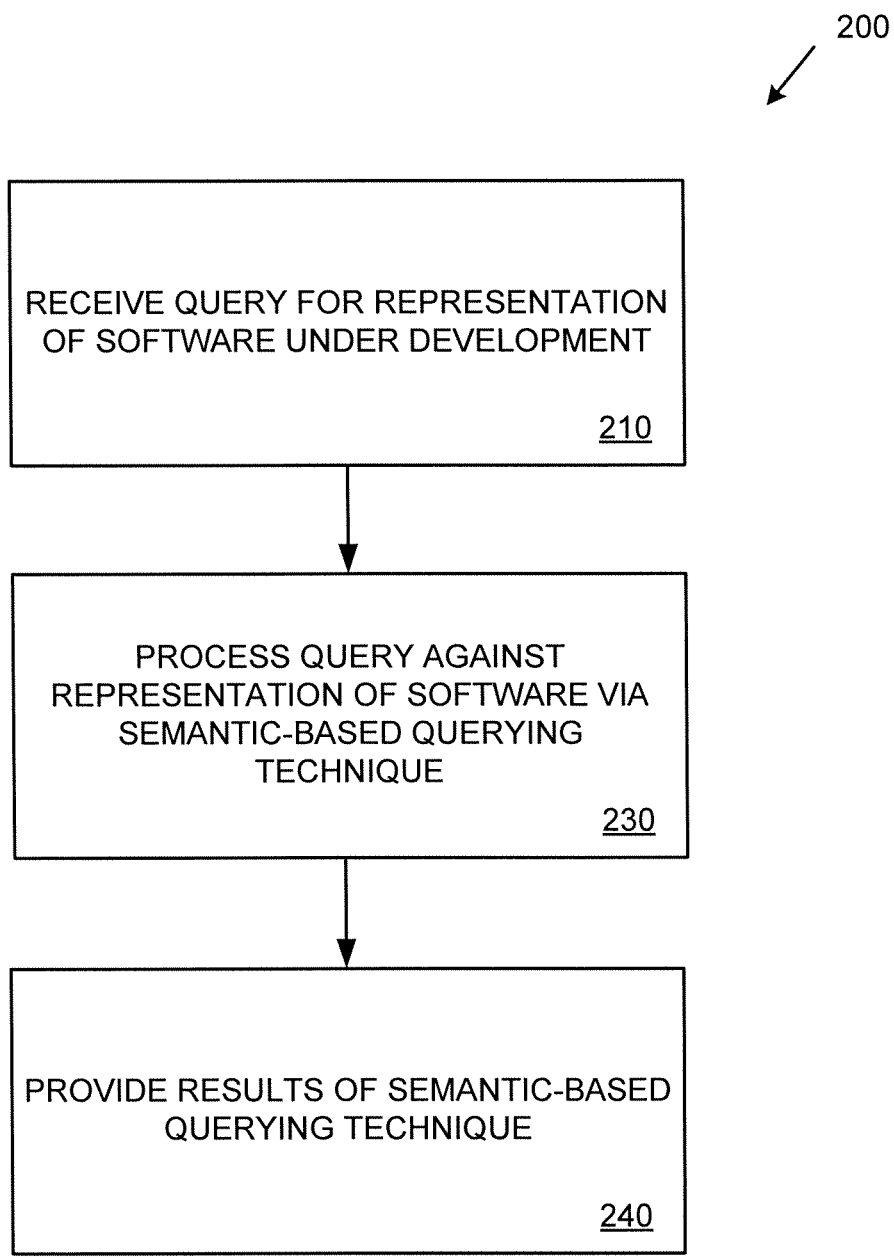
FIG. 2 is a flowchart of an exemplary method of semantic-based querying that can be implemented in a system such as that shown in FIG. 1.

FIG. 2 is a flowchart of an exemplary semantic-based querying method 200 that can be configured to include any combination of the technologies described herein. In the example, a query for a representation of software under development is received at 210. At 230, the query is processed against the representation of software via a semantic-based query technique. At 240, the results of the semantic-based query technique are provided.

The method 200 and any of the methods described herein can be performed by computer-executable instructions stored in one or more computer-readable media (e.g., storage media).

EXAMPLE 3

Exemplary Overviews of the Technologies

In practice, a semantic-based querying technique can process a query to find, within the source code, occurrences of source code elements mapped to domain concepts specified in a query. A shorthand for describing such a phenomenon is to describe it as finding occurrences of the domain concepts in the source code, even though the domain concept names do not need to literally appear in the source code.

For example, a query may search for a domain concept (e.g., "credit limit"), and hits can be returned, even though the source code uses a different term (e.g., "credlim" or some other arbitrary identifier) when using a source code element that is semantically the same as the "credit limit" domain concept.

If desired, the query can be processed to find, within the source code, occurrences of source code elements mapped to domain concepts specified in the query where operations specified in the query are performed on the source code elements.

EXAMPLE 4

Exemplary Execution of the Technologies

Figure 3:
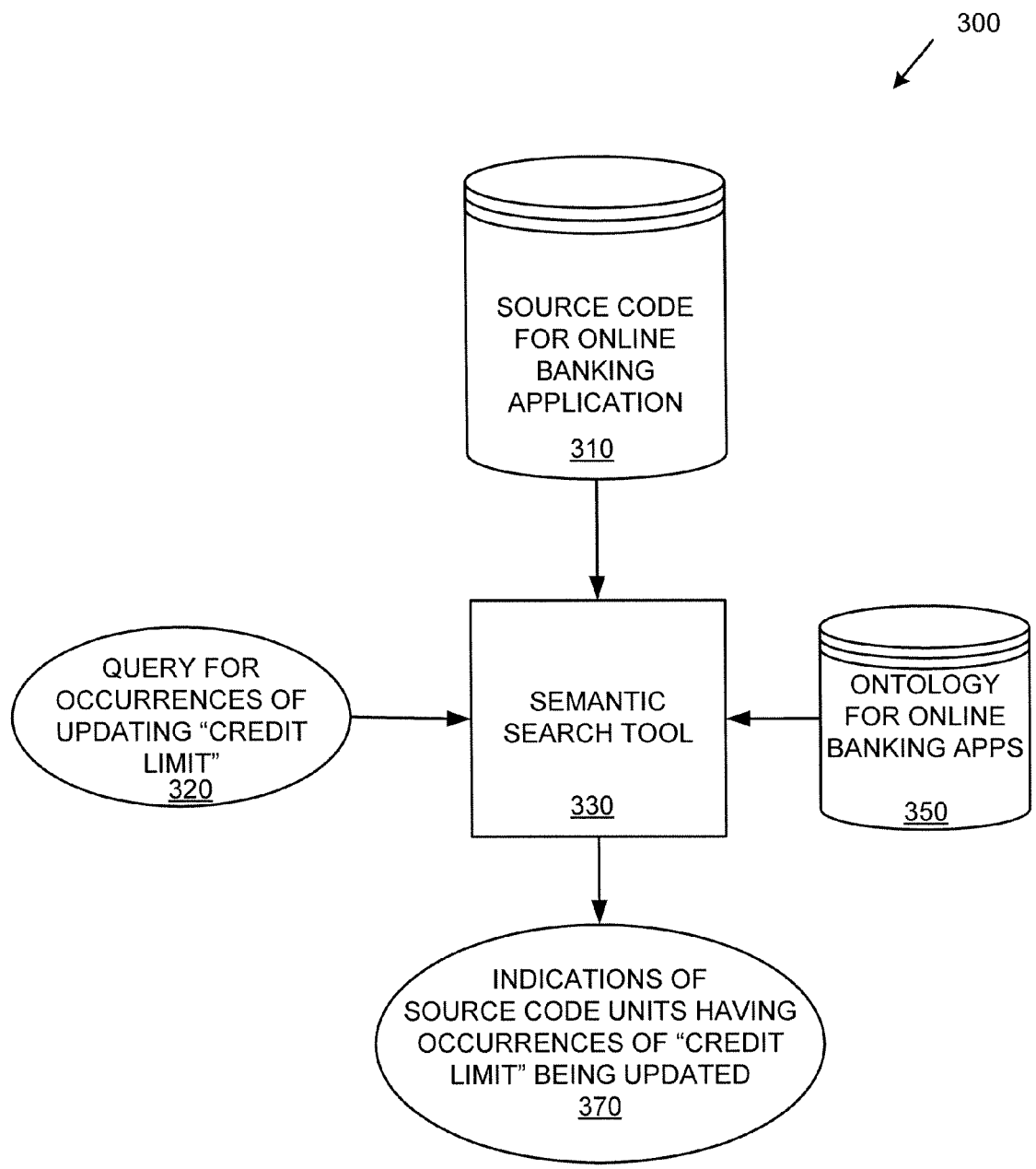
FIG. 3 is a block diagram showing exemplary execution of the technologies for a banking application.

FIG. 3 is a block diagram showing exemplary execution of the technologies described herein for a banking application. In the example, a semantic search system 300 includes a semantic search tool 330. The system accepts queries for source code of an online banking application 310.

Although an online banking application 310 is shown, the technologies can be applied to any problem domain by using an appropriate ontology 350 tailored to the problem domain.

In the example, a query 320 for occurrences of updates (e.g., modifications) of the concept "credit limit" is processed by the semantic search tool 330 via an ontology 350 for online banking applications to generate indications 370 of source code units having occurrences of updates of the concept "credit limit."

As described herein, the query 320 can use a variety of other features to search for particular occurrences of domain concepts in the source code. For example, the query can limit query results to particular circumstances under which the domain concept is invoked (e.g., a particular operation or category of operation is performed on the domain concept).

The indications 370 of source code units having occurrences of updates of the concept "credit limit" can take the form of any of the query results described herein. For example, a list of the methods having code that updates instances of the object class mapped to the "credit limit" concept can be returned as query results. The query results can indicate the names of the respective methods. For example, the name or domain concept "Approve Loan" can be indicated as one of the methods responsive to determining that the method mapped to "Approve Loan" updates instances of the object class mapped to the "credit limit" concept.

Such features can be useful when searching source code because the developer may be interested only in those occurrences in which the credit limit is updated. In this way, the many other hits related to reading the credit limit can be avoided.

EXAMPLE 5

Exemplary System Employing an Ontology and Descriptors

Figure 4:
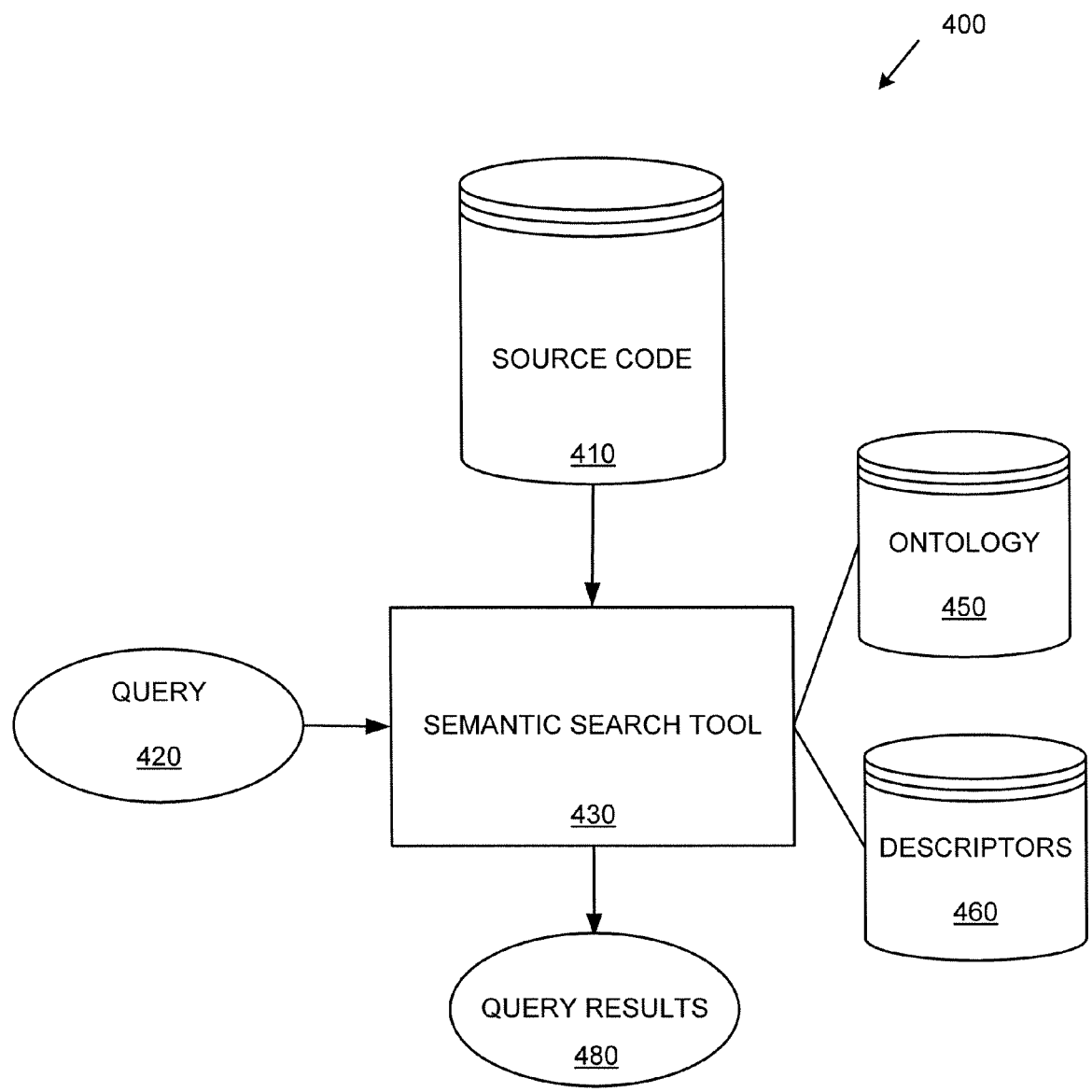
FIG. 4 is a block diagram of a semantic-based querying system that includes an ontology and code semantic descriptors.

FIG. 4 is a block diagram of an exemplary semantic-based querying system 400 that includes an ontology 450 and code semantic descriptors 460. In the example, the semantic search tool 430 is configured to accept the source code 410 and a query 420 as input and provide the query results 490 based on the ontology 450 and the code semantic descriptors 460.

In practice, after the descriptors 460 have been generated, the source code 410 may no longer need to be consulted for query processing. However, a software developer may wish to continue to consult the source code 410 even after the code semantic descriptors 460 have been generated.

Source code elements in the source code 410 can be mapped to respective domain concepts appearing in the ontology 450.

EXAMPLE 6

Exemplary Method of Making and Using a Semantic-Based Querying System

Figure 5:
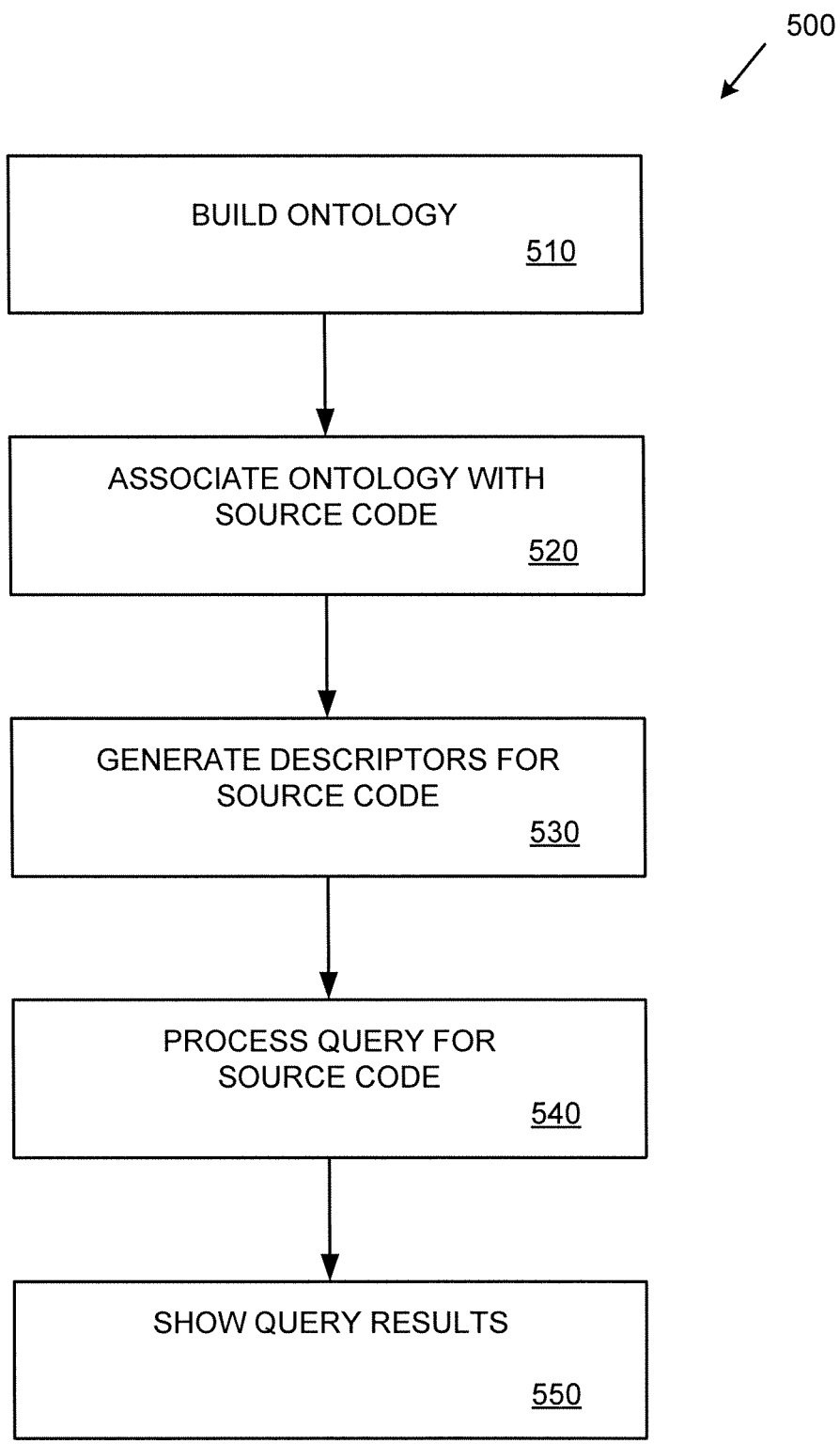
FIG. 5 is a flowchart of an exemplary method of making and using a semantic-based querying system, such as that shown in FIG. 4.

FIG. 5 shows an exemplary method 500 of making and using a semantic-based querying system. At 510, an ontology is built using any of the techniques described herein.

At 520, the ontology is associated with source code. For example, source code elements in the source code can be mapped to domain concepts in the ontology.

At 530, descriptors are generated for the source code. For example, the descriptors can indicate operations performed on elements in the source code in terms of domain concepts. If desired, the techniques described herein can be implemented without using descriptors.

At 540, a query is processed. Any of the query processing techniques described herein can be used.

At 550, query results are shown.

In practice, the different actions shown can be performed with software by different actors, and any one of the actions or a combination of one or more of the actions can be useful in itself. For example, ontology building can be performed by one group or organization and used with benefit by others performing the remaining actions. Similarly, associating the ontology with the source code and generating the descriptors can be performed by other groups or organizations and used with benefit by others performing the remaining actions. A software developer may be interested primarily in performing query processing and showing query results without having to be involved in the other actions.

The various actions shown can be performed in a fully automatic or semi-automatic manner. For example, ontology creation typically involves revision and verification by a user, as does associating the ontology with source code.

EXAMPLE 7

Exemplary Ontology

In any of the examples described herein, an ontology can comprise any representation of domain concepts. In practice, domain concepts can be represented by domain concept names stored in one or more computer-readable media (e.g., storage media). The ontology can contain domain concepts tailored for a particular problem domain (e.g., online shopping, banking, and the like).

Typically, relationships between the concepts are also represented. A plurality of different relationship types can be represented so that one or more domain concepts can be related to one or more other domain concepts in a variety of ways. In practice, such relationships can be represented in the ontology in a variety of ways. For example, any mechanism for representing a graph (e.g., a non-directed graph, directed graph, or the like) between nodes representing the concepts can be used.

Figure 6:
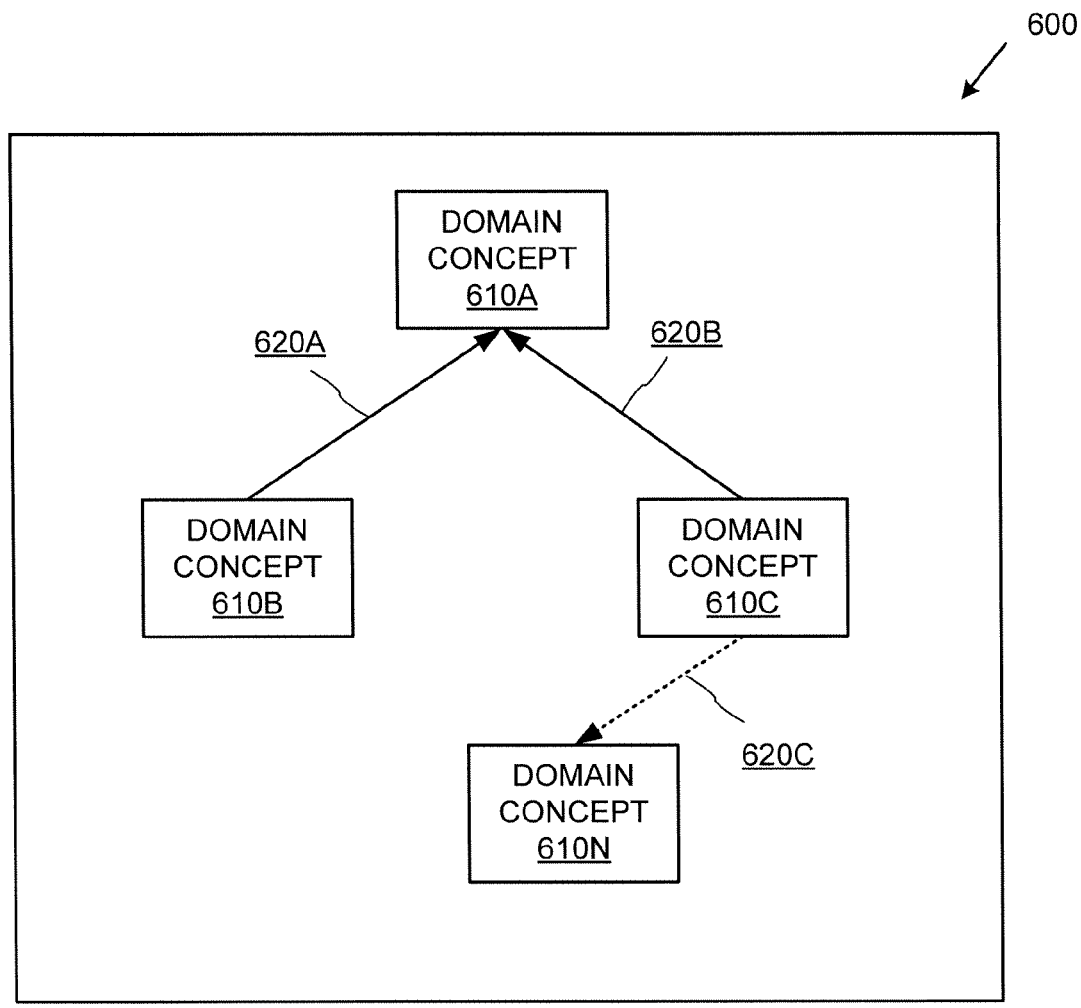
FIG. 6 is a block diagram showing an exemplary ontology that comprises domain concepts and relationships between them.

FIG. 6 shows an exemplary ontology 600 containing a plurality of domain concepts 610A, 610B, 610C, and 610N. In the example, a domain concept 610B is related to another domain concept 610A via the relationship 620A. Similarly, a domain concept 610C is also related to the domain concept 610A via a relationship 620B. The two relationships 620A and 620B are of the same type.

The domain concept 610C is related to the domain concept 610N via a relationship 620C. In the example, the relationship type of the relationship 620C is different from that of the relationship type of the other relationships 620A, 620B.

The different types of relationships can be taken into account when performing queries. For example, weights given to the domain concepts 610A-N in a query can be based at least in part on the relationship type (e.g., a different relationship results in a different weighting).

Although not shown, the ontology 600 can also include one or more synonyms for any of the concepts listed. For example, synonyms can be useful when a domain concept has a commonly used alternative term. A synonym mechanism can also be used for mapping.

In the example, the elements of the ontology are of the same type (e.g., domain concepts). In practice, there can be different types of ontology elements.

If desired, the concepts 610A-610N can have other properties, such as cardinality (e.g., an indication of whether the associated concept appears only singly or in a plurality of instances when used).

EXAMPLE 8

Exemplary Domain Concepts

In any of the examples herein, domain concepts can represent any programmatic abstraction used by software developers when developing software. For example, when working on a banking application, programmers typically use an abstraction for an account. Thus, "account" can be a domain concept. When working on a retail application, programmers typically use an abstraction for an order. Thus, "order" can be a domain concept.

When software developers write software, they include such domain concepts in the software (e.g., in source code) as data types, class names, method names, data member names, property names, variable names, and the like. Similarly, in non-object-oriented programs, domain concepts can be included as function names, procedure names, and the like.

In practice, domain concepts can be represented by the technologies described herein as domain concept names (e.g., "account," "order," "credit limit," and the like). The domain concept names can be stored in an ontology tailored to the particular problem domain at issue. Returning to the account example, if account is represented as an object, the account class can be represented in an ontology as a domain concept.

An advantage of being able to query source code with domain concepts is that a programmer who is familiar with the problem domain can more easily grasp the meaning and purpose of software if the software is described in terms of familiar domain concepts, rather than the unfamiliar names that happened to be chosen by the software developers. Further, the ability to include concepts in compound queries can give software developers a powerful tool to pinpoint particular phenomena within source code.

EXAMPLE 9

Exemplary Ontology Scope

In some scenarios, it is particularly useful to create an ontology representing a particular domain within software development, such as a web-based retail storefront application, or other application. For example, an ontology can represent an online shopping application (e.g., internet-based retail application for a pet store or the like), a banking application, or the like. Because the ontology can be tailored to a particular problem domain, a specialized semantic search system for the problem domain can be implemented by the technologies described herein.

Such an approach can be useful because software developers typically think of an application in terms of domain concepts. So, for example, in the example of an order, a software developer may be interested in which portions of the source code make reference to information associated with an order (e.g., to find a bug, plan a modification to the source code, or the like).

Thus, the ontology can be used to search source code that was developed by an organization or development team that did not even know of the existence of the ontology.

EXAMPLE 10

Exemplary Ontology Building System

In any of the examples described herein, an ontology can be built using any number of commercially available or custom user interfaces. In such a case, domain concepts can be specified by someone familiar with the particular problem domain at issue. If desired, relationships between the domain concepts can also be specified.

Figure 7:
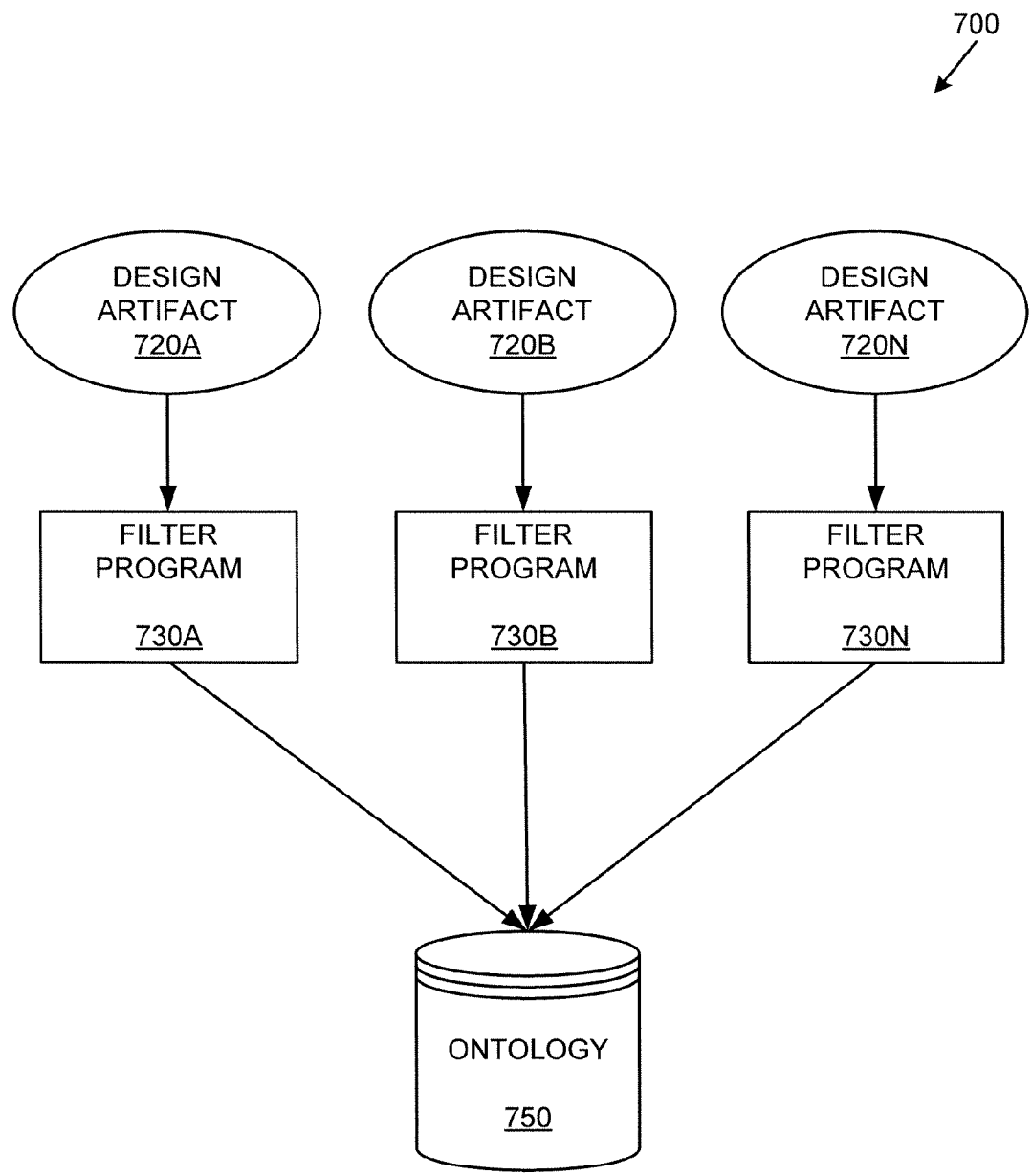
FIG. 7 is a block diagram of an exemplary system for building an ontology via design artifacts.

FIG. 7 shows an exemplary system 700 that can be used to provide assistance in building an ontology 750. In the example, one or more design artifacts 720A-N for a particular problem domain can be processed by one or more respective filter programs 730A-N to generate (e.g., extract) domain concepts and relationships in the ontology 750. The design artifacts 720A-N can include design documents (e.g., use cases), models (e.g., entity-relationship models), architecture descriptions, and the like.

Although the design artifacts can be the design artifacts used to design the source code to be searched, in practice, such design artifacts may be unavailable or incomplete. Accordingly, design artifacts from other (e.g., "model") applications in the same problem domain can be used in addition to or in place of such design artifacts.

If desired, the system 700 can also process source code via a filter program to assist in generation of domain concepts and relationships in the ontology.

EXAMPLE 11

Exemplary Ontology Building Method

Figure 8:
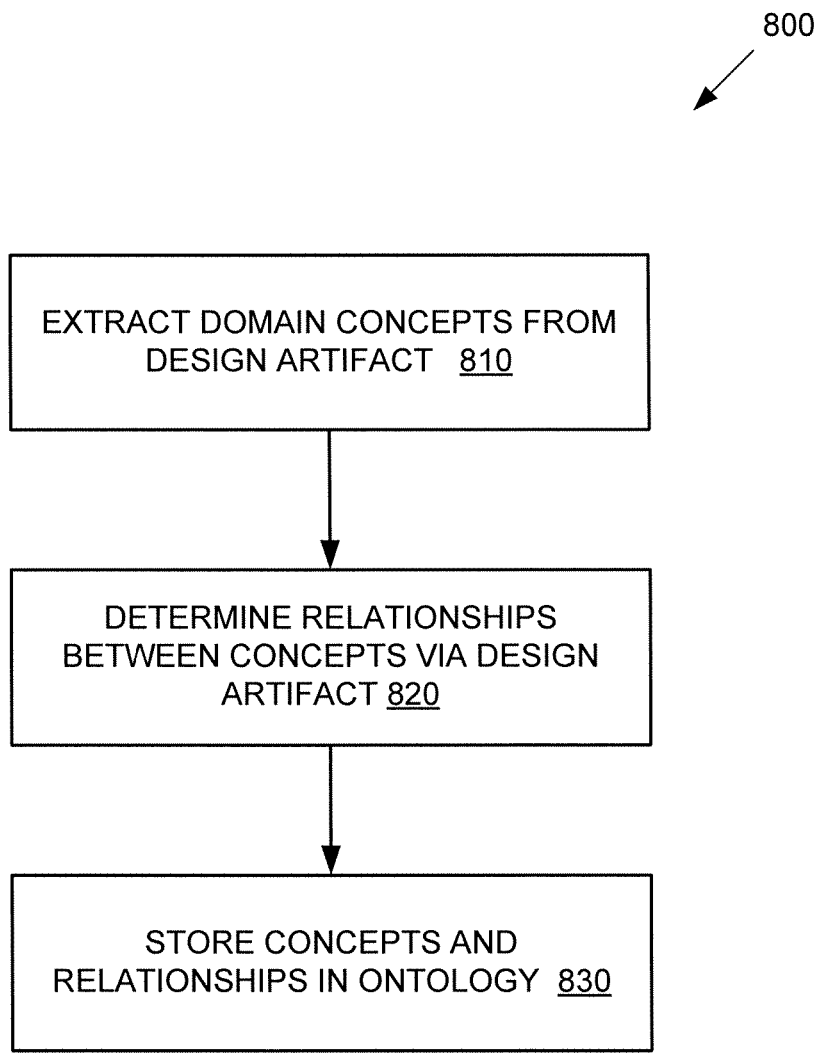
FIG. 8 is a flowchart of an exemplary method of building an ontology via design artifacts and can be performed, for example, by a system such as that shown in FIG. 7.

FIG. 8 is a flowchart of an exemplary method 800 of building an ontology via design artifacts and can be performed, for example, by a system such as that shown in FIG.

7 to achieve action 510 of FIG. 5. In the example, domain concepts are extracted from one or more design artifacts at 810. At 820, relationships between concepts are determined via the design artifacts. At 830, the domain concepts and relationships between them are stored in the ontology.

In practice, the domain ontology generated by the process is a rudimentary ontology that can be viewed by a domain expert to verify the relationships, create new domain concepts, create new relationships, and the like. Also, synonyms can be created for those concepts that have different names in the ontology but are conceptually the same (e.g., mean the same thing). For example, the term "customer" in a use case document may mean the same thing as the term "User" in the design document and "user" in the entity relationship model. If so, the automated process may create three concepts in the ontology. A user interface can be presented to a domain expert who manually indicates that the three terms are the same concept. Subsequently, when the ontology is used, these three terms are treated as a single concept (e.g., for purposes of querying and the like).

A variety of rules can be used when processing design artifacts. For example, nouns in use case documents can be extracted as domain concepts via text processing techniques. Entities in entity-relationship models can be treated as domain concepts, and relationships between them used to create relationships (e.g., "has-a") between the corresponding domain concepts in the ontology.

EXAMPLE 12

Exemplary Class Hierarchy Used to Build an Ontology

Figure 9:
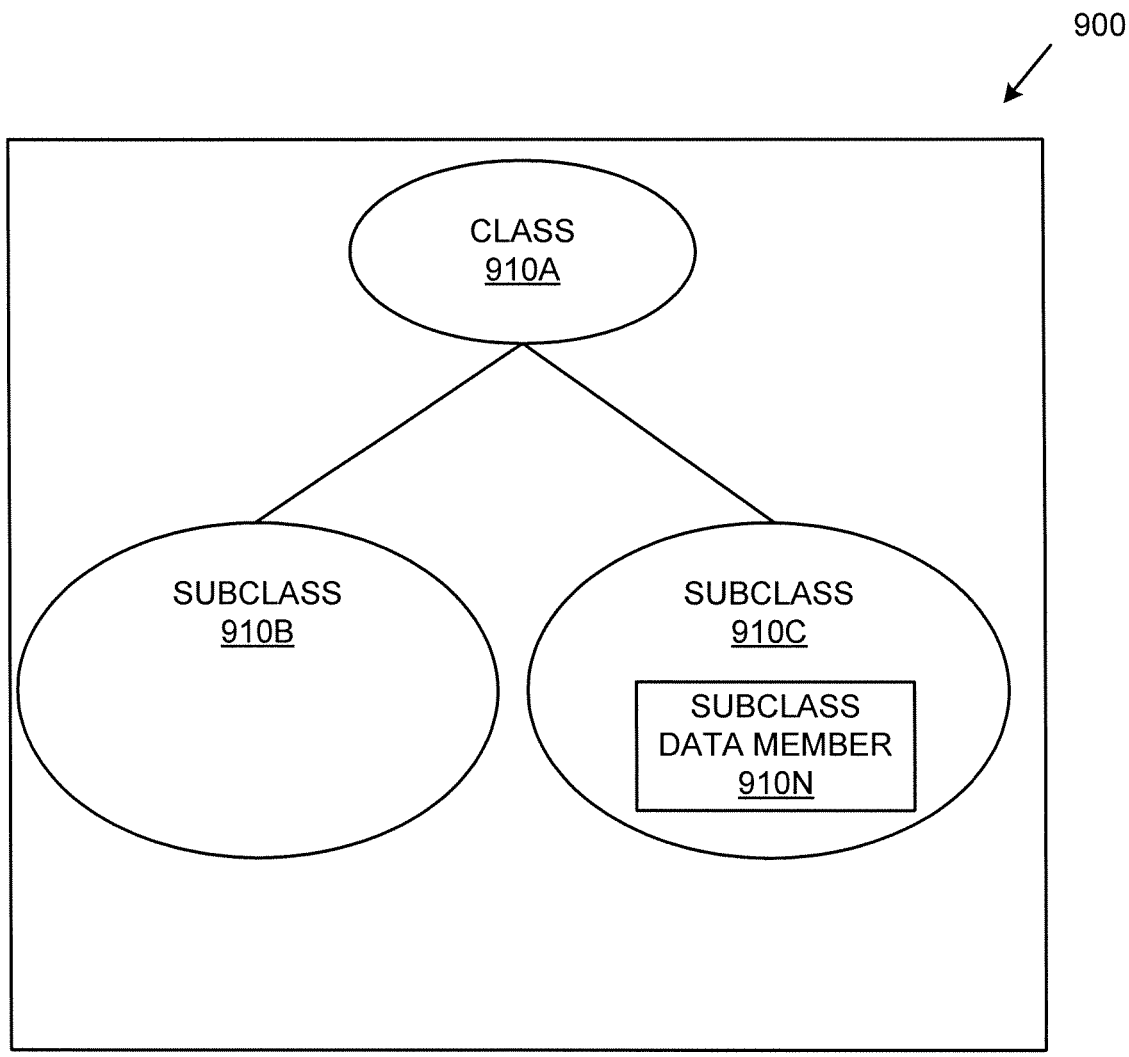
FIG. 9 is a block diagram of an exemplary class hierarchy.

FIG. 9 is a block diagram of an exemplary class hierarchy 900 for which an ontology is to be created. In the example, a parent class 910A has two subclasses 910B and 910C. The subclass 910C has a subclass data member (e.g., a field of the subclass) 910N.

Figure 10:
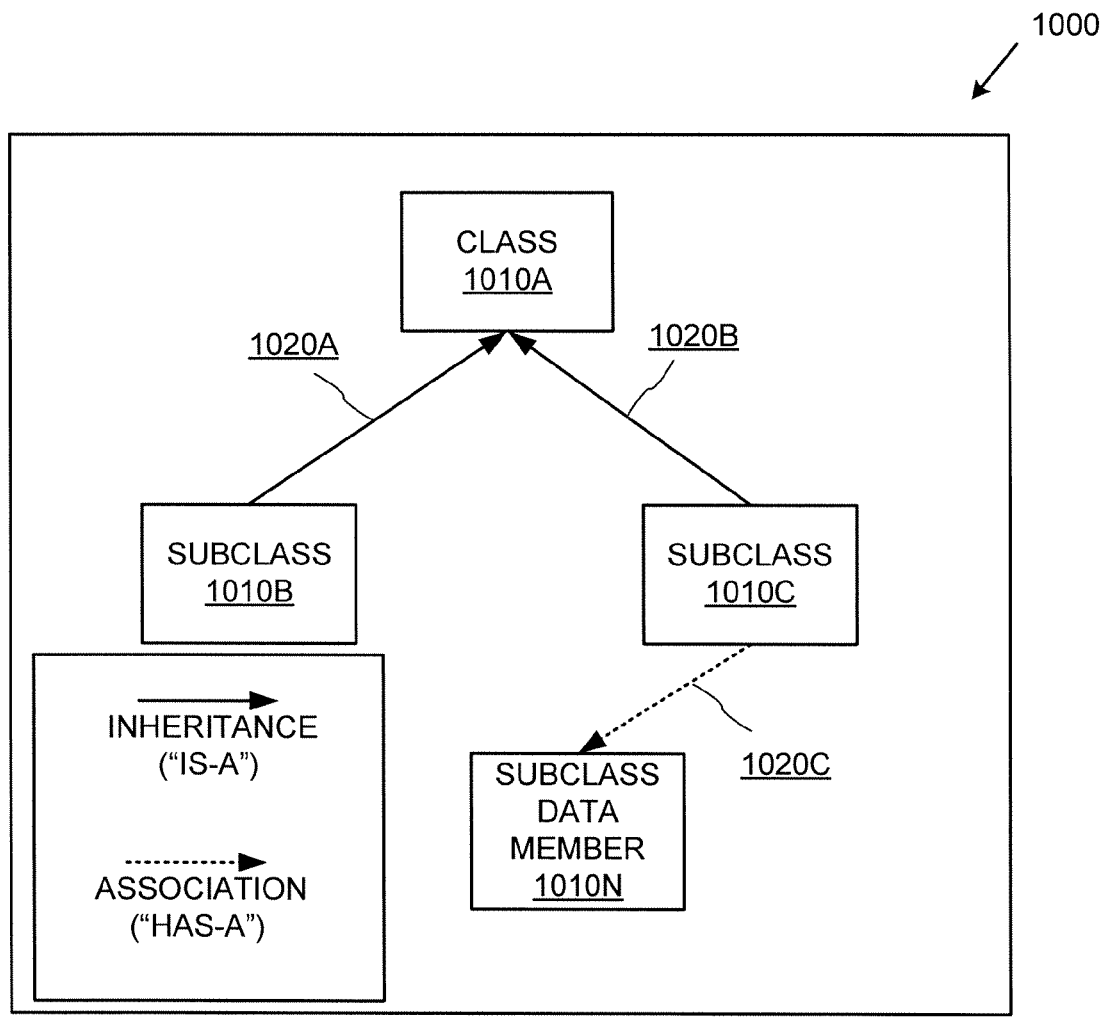
FIG. 10 is a block diagram of an exemplary ontology representing domain concepts related to the class hierarchy shown in FIG. 9.

FIG. 10 shows an exemplary ontology 1000 created based on the class hierarchy 900 of FIG. 9. In the ontology 1000 there are four concepts 1010A, 1010B, 1010C, 1010N shown that are related by relationships 1020A, 1020B, 1020C. For inheritance relationships (e.g., between a class and a subclass), a first type of relationship (e.g., "is-a") is created between the domain concepts representing the class in the inheritance relationship. For domain concepts appearing as slots (e.g., data members or methods of the class) in the class definition, a second type of relationship (e.g., "has-a") is created between the class and the slot. Additional relationships (e.g., "uses") can also be depicted in the ontology (e.g., based on use of a concept in model source code from which domain concepts and relationships are extracted).

EXAMPLE 13

Exemplary Source Code Element-Ontology Mapping System

Figure 11:
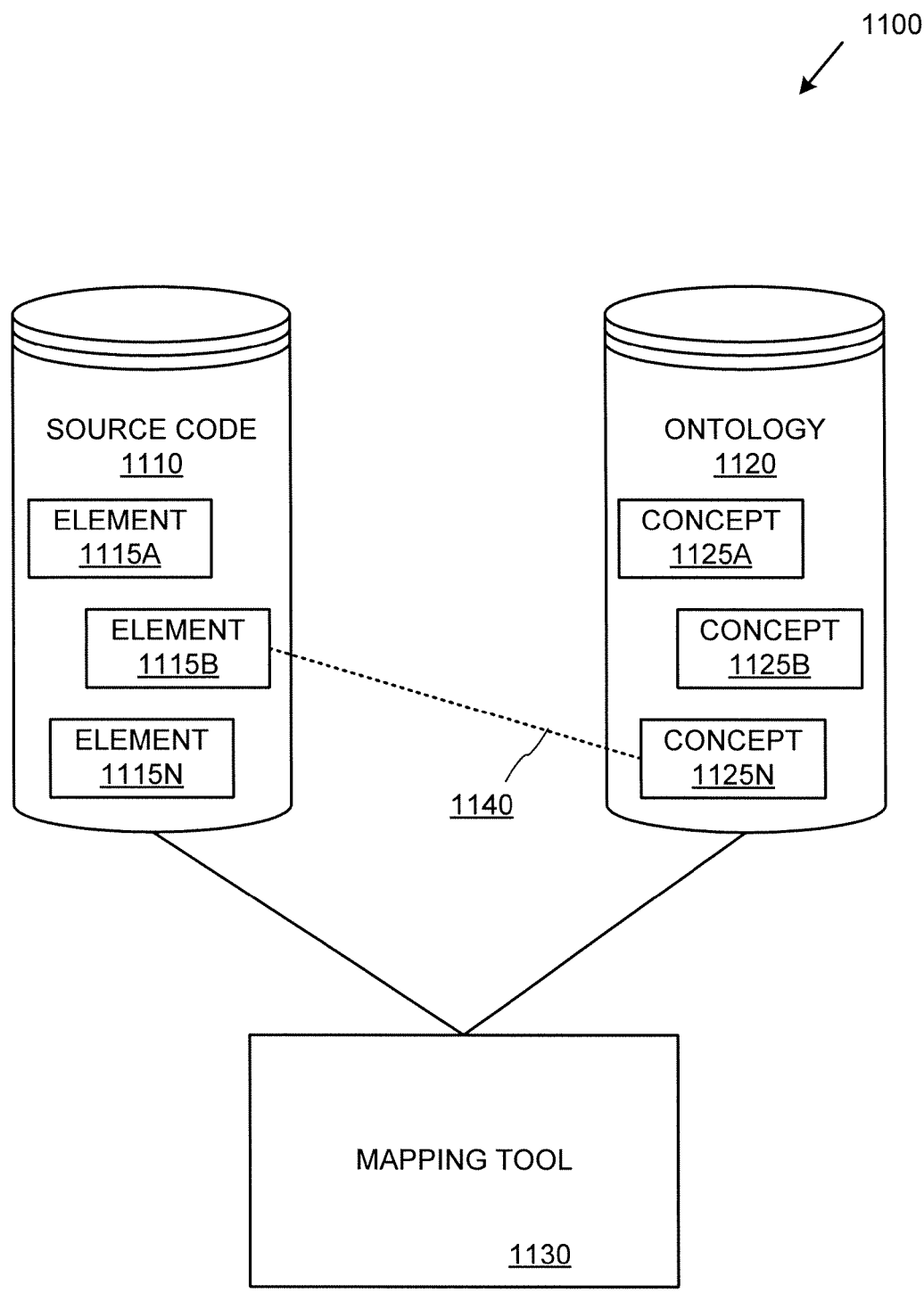
FIG. 11 is a block diagram of an exemplary system for associating source code elements with domain concepts.

In any of the examples herein, an association between source code elements and ontology domain concepts can be achieved via a mapping between the elements and the concepts. FIG. 11 is a block diagram of an exemplary system 1100 for mapping source code elements with domain concepts and can be used to perform, for example, the action 520 of FIG. 5. The source code 1110 and the ontology 1120 are used as input to create associations (e.g., mappings) between various source code elements and the ontology 1120.

In the example, a representation of source code 1110 contains a plurality of source code elements 1115A, 1115B, 1115N, and the ontology 1120 stores a plurality of domain concepts 1125A, 1125B, 1125N. The mapping tool 1130 can be used to create one or more mappings 1140 between the source code elements 1115A, 1115B, 1115N and respective domain concepts 1125A, 1125B, 1125N.

A mapping 1140 between a source code element 1115B and a respective domain concept 1125N can be represented in a variety of ways. For example, the mapping 1140 can be stored in a separate data structure, or noted within the ontology 1120. For example, a name of the source code element 1115B can be stored in a list for the respective domain concept 1125N. A synonym feature can be used to indicate the mapping. If so, the source code element 1115B can be indicated as a synonym of the respective domain concept 1125N.

For example, a class "OrderEJB" in a J2EE application can be mapped to the domain concept "Order" in the ontology.

If desired, the mapping tool 1130 can be integrated as part of a search tool (e.g., the search tool 430 of FIG. 4) or provided separately. A user interface can be provided by the mapping tool 1130 to assist a user who wishes to assist in the mapping process.

A mapping can be implemented with or without a weight (e.g., to indicate that a domain concept is related to a particular source code element in a stronger way than other source code elements or vice versa). If a weight is used, search results can reflect the weight (e.g., via a score for a particular hit).

EXAMPLE 14

Exemplary Source Code Element-Ontology Mapping Method

Figure 12:
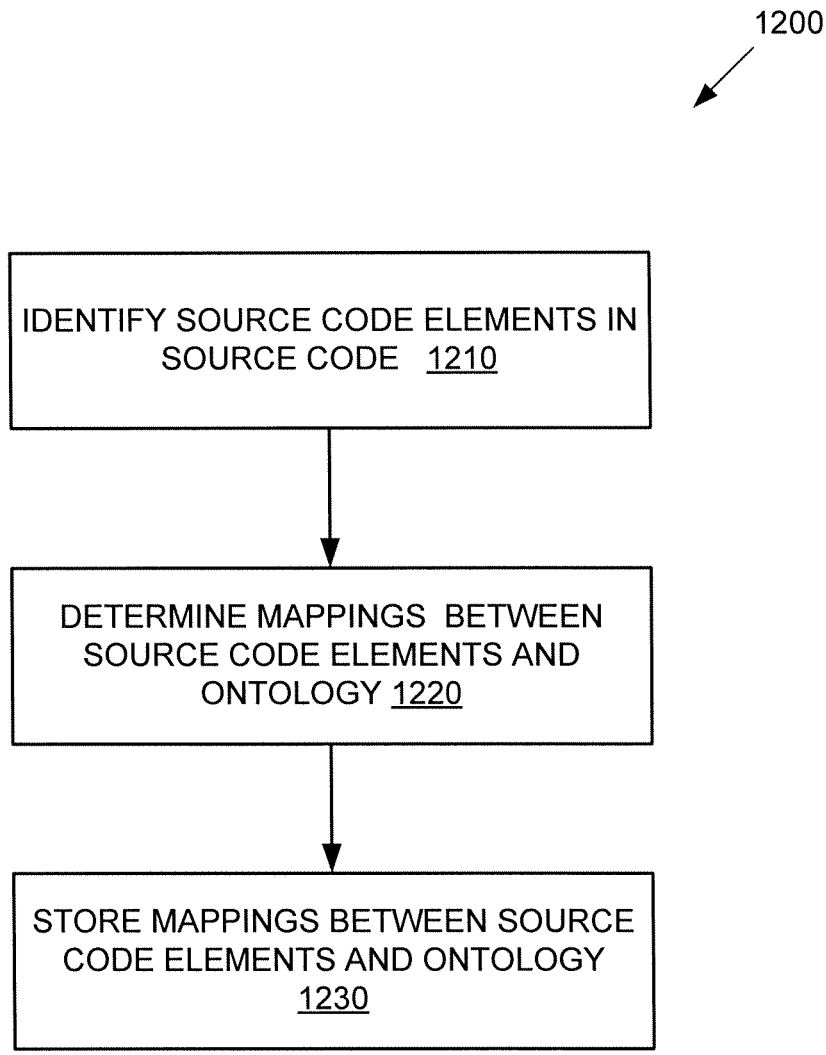
FIG. 12 is a flowchart of an exemplary method of associating source code elements with domain concepts and can be performed, for example, by a system such as that shown in FIG. 11.

FIG. 12 shows an exemplary method 1200 that can be used to create mappings between source code elements and ontology domain elements. The method can be performed, for example, by a system such as that shown in FIG. 11 to achieve the action 520 of FIG. 5.

At 1210, source code elements are identified in the source code to be searched. For example, keywords can be extracted as source code elements from the source code by finding variable types, method names, and the like. For example, declarations (e.g., a class definition) can define a source code element in the source code. Source code compilation techniques can be used.

At 1220, a plurality of mappings between source code elements and respective associated domain concepts is determined. Such mappings can be specified by a user via a user interface. To achieve the mapping, similarities between the source code element name and the domain concept name can be identified (e.g., by a mapping tool). For example, a comparison can determine identity between letters in the source code element name and the domain concept name to indicate likely mappings or automatically map. Synonyms can be used during the comparison.

A user can specify the mapping set manually (e.g., identifying mappings by reviewing the elements and the concepts and specifying them to a tool), with assistance from a mapping tool (e.g., approving recommendations made by the tool), or both. Mapping can be done to indicate that the source code element is semantically related to the domain concept.

At 1230, the mappings between the source code elements and a respective domain concepts are stored (e.g., as a set of mappings). The mapping can be represented by storing the source code element in a list associated with a domain concept (or vice versa), as a synonym, or the like.

EXAMPLE 15

Exemplary Source Code Units

In any of the examples herein, a source code unit can be any measurable discrete span of source code that appears in a program. For example, in object-oriented programming languages, such a unit may be a method, class, or the like. In non-object-oriented programming languages, such a unit may be a function, procedure, or the like. Sometimes such a unit is called a "service."

EXAMPLE 16

Exemplary Code Semantic Descriptor

Figure 13:
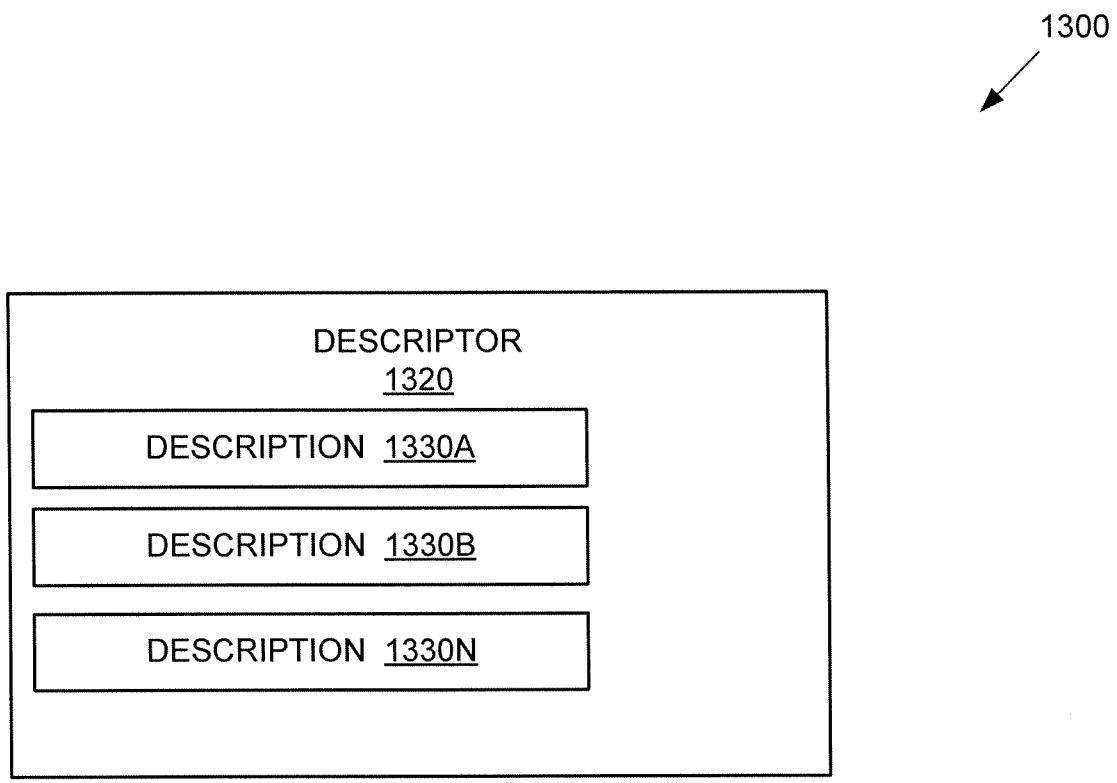
FIG. 13 is a block diagram of an exemplary code semantics descriptor.

FIG. 13 shows an exemplary data structure 1300 for storing a code semantics descriptor 1320. In practice, a plurality of descriptors 1320 can be stored for source code. Semantic-based querying techniques can be achieved by searching the descriptors.

The descriptor 1320 comprises a plurality of descriptions 1330A, 1330B, 1330N of the source code to be searched. One or more of the descriptions 1330A, 1330B, 1330N can describe operations performed on ontology domain concept names in the source code. For example, such operations can be described in terms of ontology domain concept names (e.g., a description of operations performed on source code elements by the source code using domain concept names in place of the source code elements or in place of variables of the source code element's type). In such an approach, the domain concept names mapped to the respective source code elements are used in the code semantics descriptor.

Code semantic descriptors can be stored as structured text. Code semantic descriptors can be organized in a variety of ways. For example, delimiters, keywords, or both can be used. Other structured text techniques (e.g., XML or the like) can be used. The code semantic descriptors can be stored in a code semantic descriptor repository.

A plurality of code semantic descriptors can be used to describe different portions of the source code. For example, a code descriptor can represent a particular method or other source code unit. In this way, the source code can be represented by semantic code descriptors for respective methods appearing in the source code.

A code semantic descriptor can also indicate dependencies in the source code (e.g., in which class the source code described appears).

EXAMPLE 17

Exemplary Code Semantic Descriptor Generation System

Figure 14:
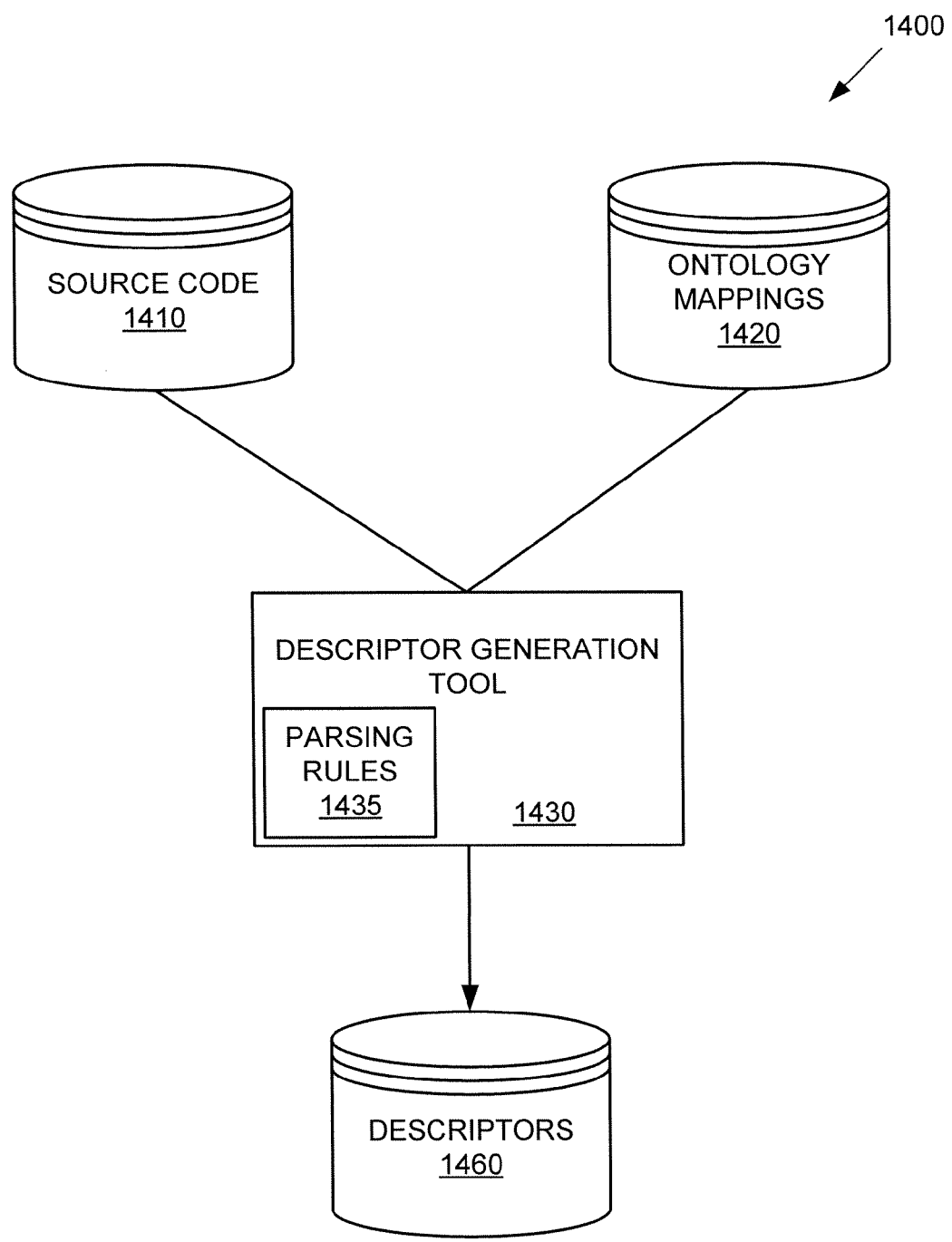
FIG. 14 is a block diagram of an exemplary system for generating code semantics descriptors from source code.

FIG. 14 is a block diagram of an exemplary system 1400 for generating code semantics descriptors 1460 from source code 1410. In the example, the source code to be searched 1410 and the ontology mappings 1420 indicative of associations between domain concepts and source code elements are used by the descriptor generation tool 1430 to generate the descriptors 1460. As shown, parsing rules 1435 can be used by the tool 1430 to generate the descriptors 1460.

If desired, the descriptor generation tool 1430 can be integrated as part of a search tool (e.g., the search tool 430 of FIG. 4) or provided separately.

EXAMPLE 18

Exemplary Code Semantic Descriptor Generation Method

Figure 15:
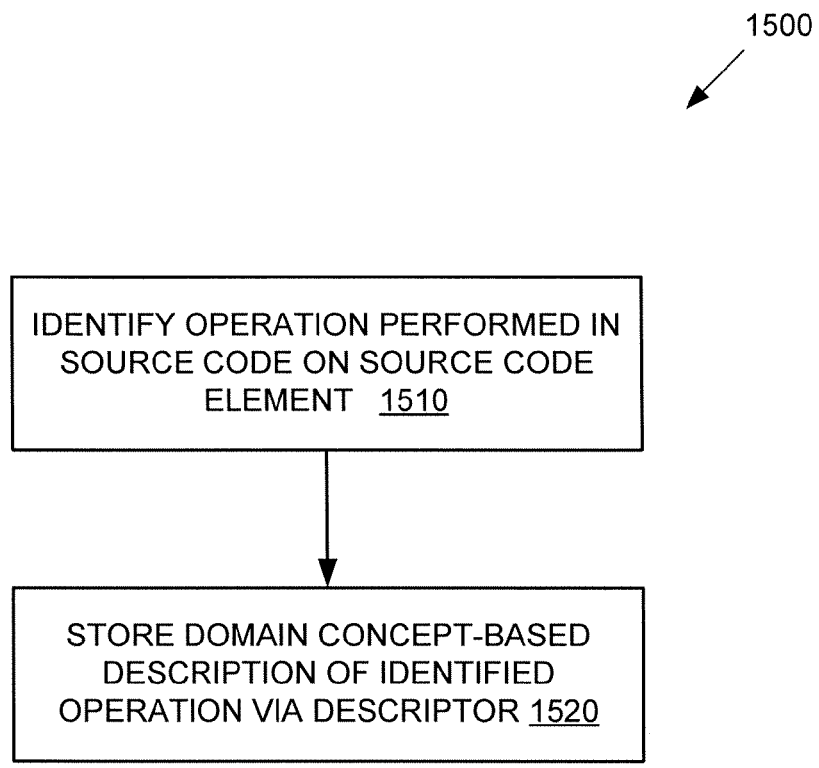
FIG. 15 is a flowchart of an exemplary method of generating code semantics descriptors.

FIG. 15 is a flowchart of an exemplary method of generating code semantics descriptors from source code and can be performed, for example, by the system 1400 of FIG. 14 to achieve the action 530 of FIG. 5.

In the example, at 1510 the source code is systematically scanned (e.g., parsed) to identify source code elements. Compiler-based methods can be used. The method can also identify operations performed in the source code on the source code elements. Responsive to identifying such an operation, a domain concept-based description of the operation is stored 1520 via a code semantic descriptor. If desired, a summary of the operation can be stored in place of or in addition to a description of the operation.

Various structural elements (e.g., method body, function body, class structures, data structures, and the like) of the source code can be used to create the code semantics descriptors.

EXAMPLE 19

Exemplary Summary of Operations Generation Method

Figure 16:
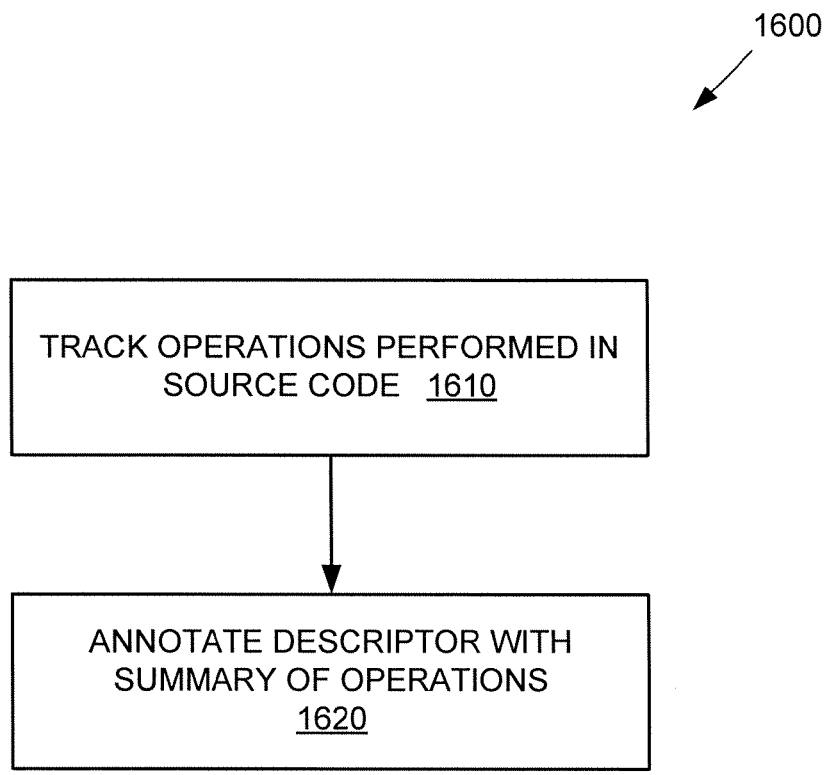
FIG. 16 is a flowchart of an exemplary method of annotating a descriptor with a summary of operations.

FIG. 16 is a flowchart 1600 of an exemplary method of annotating a descriptor with a summary of operations that can be used in any of the methods described herein for generating a code semantic descriptor. At 1610, operations performed in source code on source code elements are tracked. At 1620, the code semantics descriptor is annotated with a summary of such operations. Tracking can be done separately from identifying the operations, or a stored description of the operations can be used to generate the summary.

Such a summary of operations can indicate a list of the domain concepts mapped to source code elements appearing in (e.g., used within) the source code unit of the code semantics descriptor. Additional detail (e.g., the operation type) can be included in the summary of operations. Such a summary can be used in addition to or in place of a more detailed description of operations within the code semantic descriptor.

EXAMPLE 20

Exemplary Location Generation Method

Figure 17:
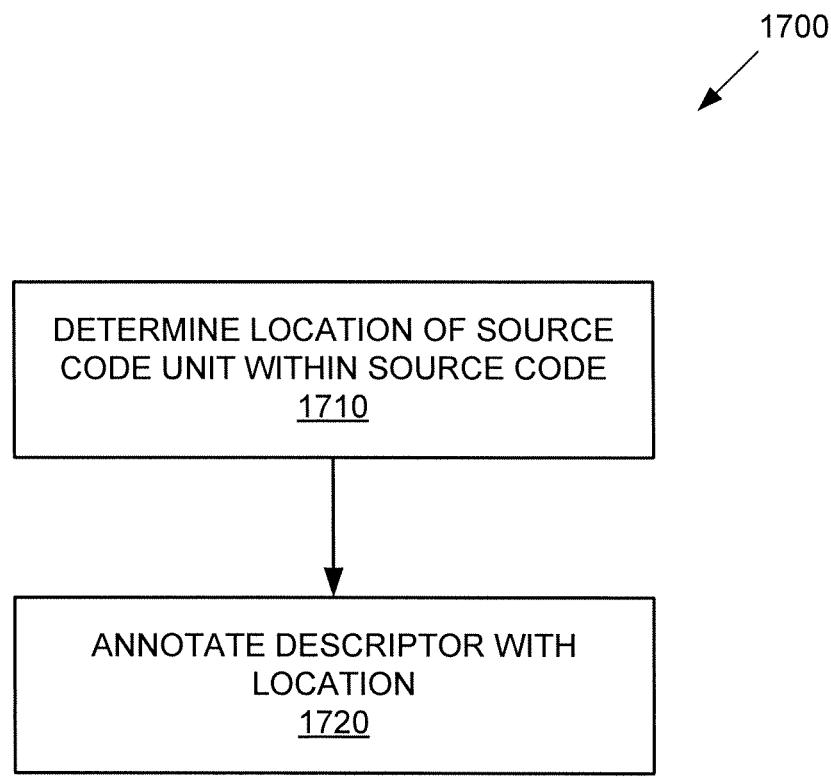
FIG. 17 is a flowchart of an exemplary method of annotating a descriptor with a location within source code.

FIG. 17 is a flowchart 1700 of an exemplary method of annotating a descriptor with a location of a source code unit within source code that can be used in any of the methods described herein for generating a code semantic descriptor. At 1710, a location of a source code unit for the semantic code descriptor (e.g., the source code unit described by the descriptor) is determined. At 1720, the descriptor is annotated with the location.

Such a location can be specified in terms of domain concepts. For example, if a method appears in the definition of a particular class, the domain concept mapped to the class can be used to indicate where (e.g., in which class) the method appears.

In addition, a link can be specified as the location. For example, such a link can indicate the line number and file where the source code unit appears. The link can be used to navigate quickly to a location of the source code unit described by the descriptor.

EXAMPLE 21

Exemplary Code Semantic Descriptor with Summary and Detail

Figure 18:
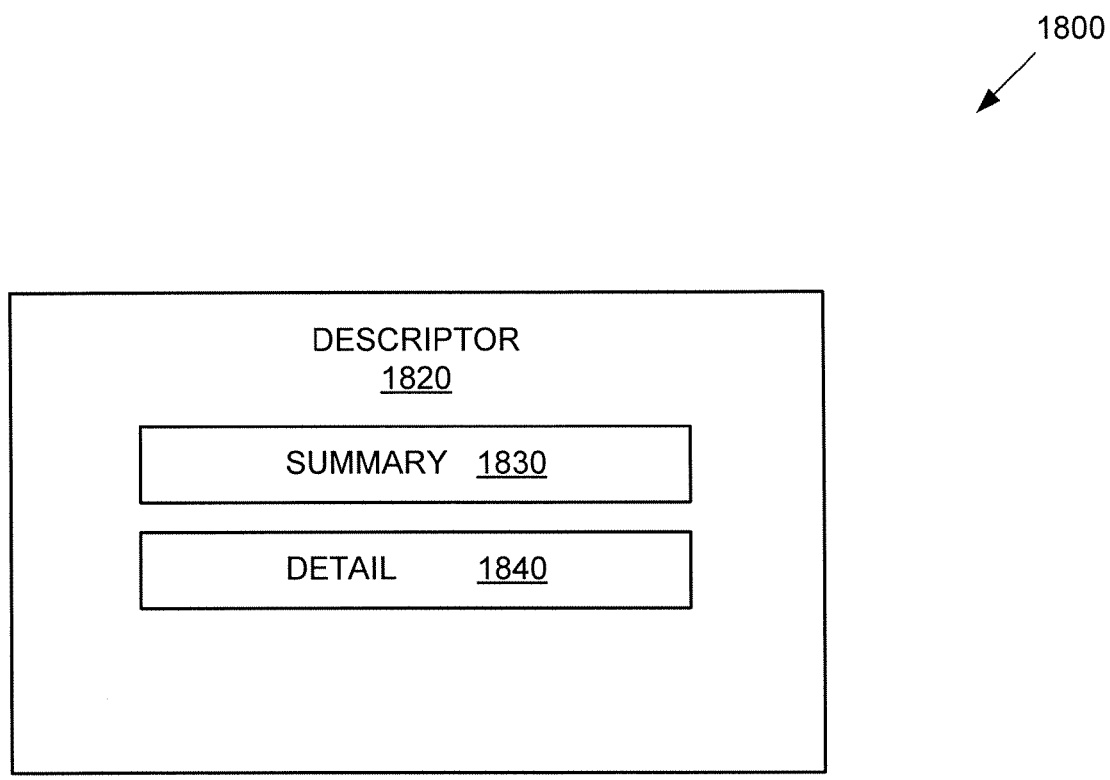
FIG. 18 is a block diagram of an exemplary code semantics descriptor with a summary section and a detail section.

FIG. 18 is a block diagram of an exemplary data structure 1800 for storing a code semantics descriptor 1820. In the example, a summary 1830 section of the descriptor as well as detail 1840 concerning operations performed on source code elements mapped to domain concepts within the source code.

EXAMPLE 22

Exemplary Arrangement of Information within Summary and Detail Sections

Figure 19:
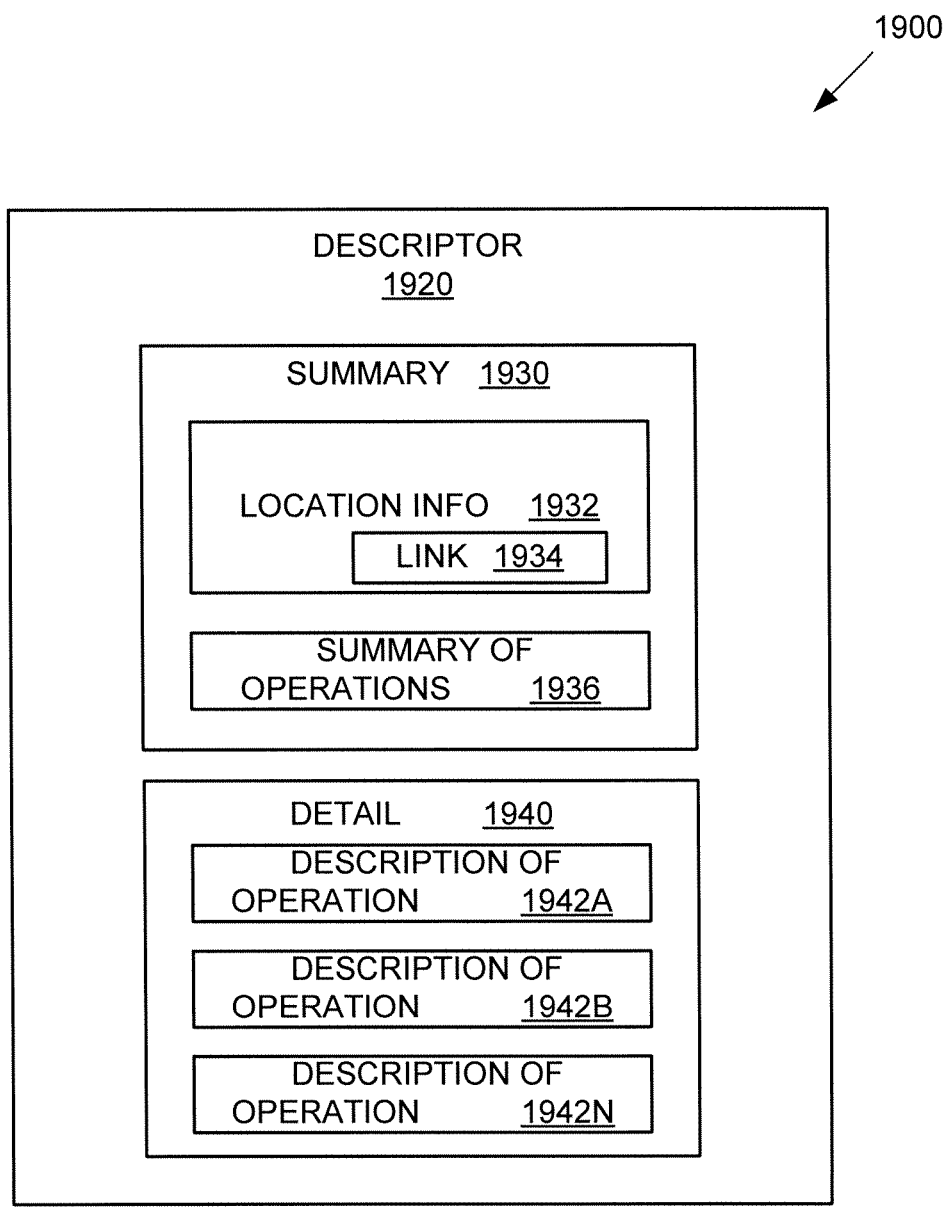
FIG. 19 is a block diagram of an exemplary code semantics descriptor with various entries, including descriptions of operations.

FIG. 19 is a block diagram of an exemplary data structure 1900 storing a code semantics descriptor 1920 that includes a summary 1930 section and a detail 1940 description of the source code unit represented by the descriptor 1920. Arrangement of the information can be varied as desired.

For example, the summary 1930 can include a name of the source code unit described by the descriptor 1920. The summary 1930 can also include a summary 1936 of the operations performed as well as other information helpful for determining the purpose of the source code unit represented by the descriptor 1920, such as any of the location information described herein, including a link 1934 to a line number in the source code.

The summary 1930 can be presented in human readable form for review by a developer or used to build a human readable summary of the source code unit. Further, the summary can be used to index the descriptor 1920 as described herein.

The code semantics descriptor 1920 can also include a detail 1940 section, in which more detailed descriptions 1942A, 1942B, 1942N of operations are stored.

The summary 1930 section and the detail 1940 section can describe the source code unit represented via the use of entries in the descriptor 1920 that use any of the code semantic descriptor fields described herein.

EXAMPLE 23

Exemplary Descriptor Fields

In any of the examples herein, a variety of descriptor fields can appear in a code semantics descriptor. Table 1 lists exemplary descriptor fields that can be indicated by the use of keywords. In practice, different keywords can be used (e.g., "unit" or "method" can be used instead of "service" to indicate the source code unit described by the descriptor). Further, other or additional keywords can be used as desired to indicate other or additional characteristics of the source code represented by the code semantics descriptor.

TABLE 1

Exemplary Descriptor Fields

| Descriptor Keyword | Meaning |
| --- | --- |
| Service <source code unit name> | The name of the source code unit described by the descriptor. |
| Module <module name> | The name of the source code module in which the source code unit appears. |
| Uses <domain concept(s)> | Whether a source code element mapped to a domain concept appears (e.g., is used) in the source code unit. |
| Performs <operation> <domain concept(s)> | Describes which operation categories (e.g., update, create, remove, and the like) the source code unit performs on source code elements mapped to domain concepts. |
| Involved-in <class name> | Indicates location by specifying the name of the object class in which the source code unit appears. |
| <location link keyword> | Indicates a link to a location in source code at which the source code unit appears. For example, "line" and "file" can be used to specify a line number and file (e.g., of the start and end of the source code unit represented by the code semantics descriptor). |
| <statement descriptor keyword> | Statement in the source code unit, describes operations in detail in terms of domain concepts mapped to respective source code elements. |

EXAMPLE 24

Exemplary Operations and Operation Categories

In any of the examples herein, a variety of operations can be performed on source code elements mapped to domain concepts. Such operations can include reading values, assigning values, updating values, creating objects, destroying objects, iterating in a loop using a variable, and the like.

To facilitate searching, operations can be categorized into broad categories, such as "reads," "creates," "updates," "deletes," and the like.

In practice, an operation performed on a source code element can comprise performing an operation on a variable in the source code that is an instance of a type indicated by the source code element. Thus, an operation performed on a source code element "PurchaseOrder" can comprise performing an operation on a variable "po" that is an instance of the "PurchaseOrder" type.

Any of the code semantics descriptors described herein can describe or otherwise indicate any of the operations.

Determining which operation is performed in source code can be achieved by mapping source code operations to categories. For example, assignment, method invocation, ++, and the like are valid operators for indicating an "update" operation. Many others are possible.

EXAMPLE 25

Exemplary Source Code

In any of the examples herein, the source code can be any software source code for an object-oriented programming language or a non-object-oriented programming language. For example, Java, Basic, C, C++, COBOL, FORTRAN, LISP, PROLOG, Perl, scripting languages, and the like can be processed.

In some cases, the source code can be represented by a model of the source code (e.g., a database with elements and operations performed on them), an intermediate representation, or the like. In such a case, the representation of the source code can be used in place of the source code in any of the examples herein.

The source code typically deals with a particular problem domain. An ontology tailored to the same problem domain can be used when employing any of the semantic-based querying techniques described herein.

EXAMPLE 26

Exemplary Source Code Elements

In any of the examples herein, a source code element can be any identifier or symbol used in source code to refer to elements in the source code. Such elements can include data type names and named instances of such data type names. For example, class names, structure names, or other identifiers for data types as well as variable names, method names, or other identifiers for instances of data types can be source code elements. In practice, such source code elements can appear in source code as alphanumeric identifiers (e.g., "Ordr1").

EXAMPLE 27

Exemplary Links to Source Code

Figure 20:
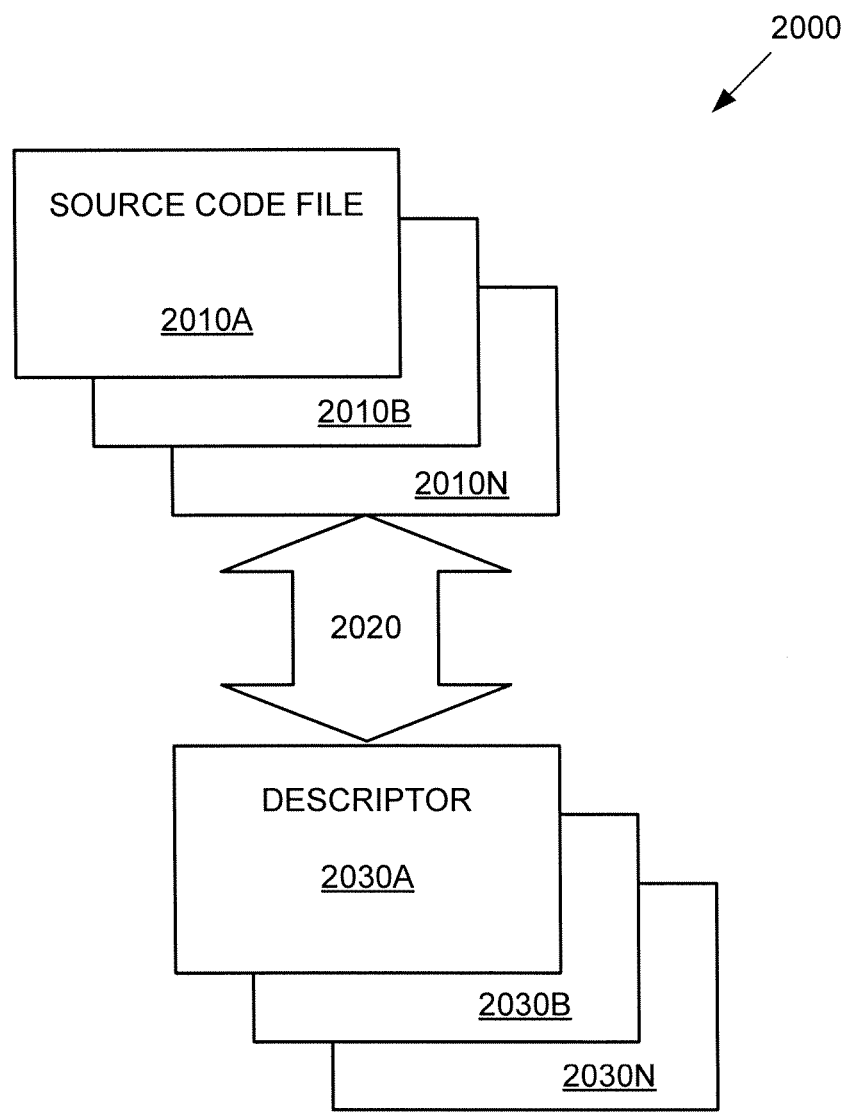
FIG. 20 is a block diagram of exemplary links between code semantics descriptors and respective source code files.

FIG. 20 is a block diagram of exemplary links 2020 between code semantics descriptors 2030A-N and respective source code files 2010A-N. As described herein, the links 2020 can be implemented as an indication of a location within a source code file (e.g., the source code file name and a line number). The starting line number within the file, the starting and ending line numbers, and the like can be specified.

The code semantics descriptors can be stored as an independent text file or files with references to the source code. Alternatively, linking can be implemented by adding the code semantics descriptor as comments in the source code.

EXAMPLE 28

Exemplary Method for Linking to Source Code

Figure 21:
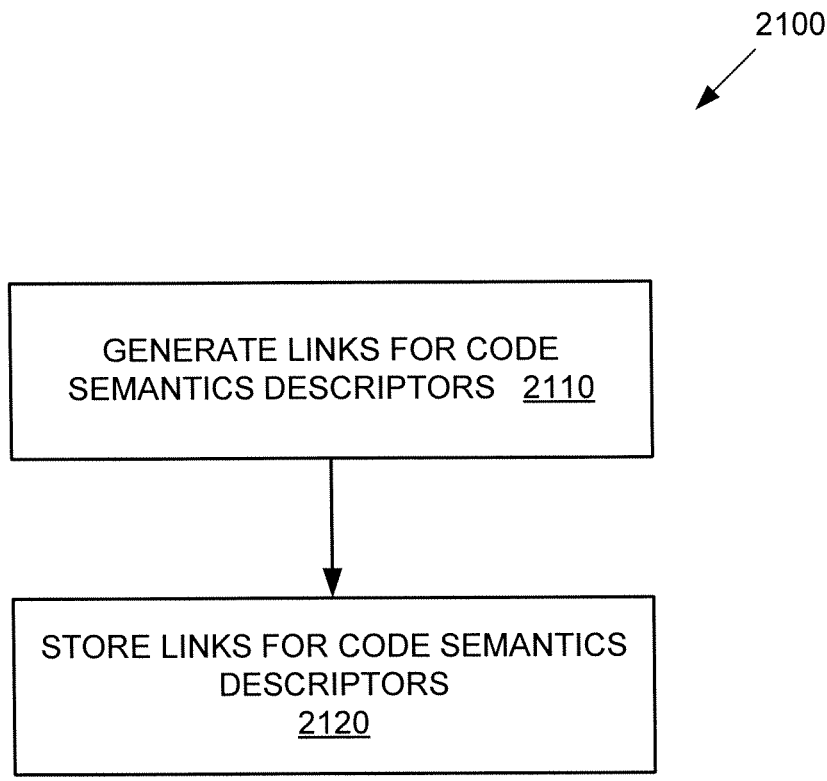
FIG. 21 is a flowchart of an exemplary method for linking source code and code semantic descriptors.

FIG. 21 is a flowchart of an exemplary method 2100 for linking source code and code semantic descriptors. At 2110, links for respective code semantics descriptors are generated. For example, the location of the source code unit described by the descriptor can be determined.

At 2120, the links for the code semantics descriptors are stored. For example, linking information (e.g., location information) can be stored in the respective descriptors or in a separate data structure.

EXAMPLE 29

Exemplary Linking Information

Figure 22:
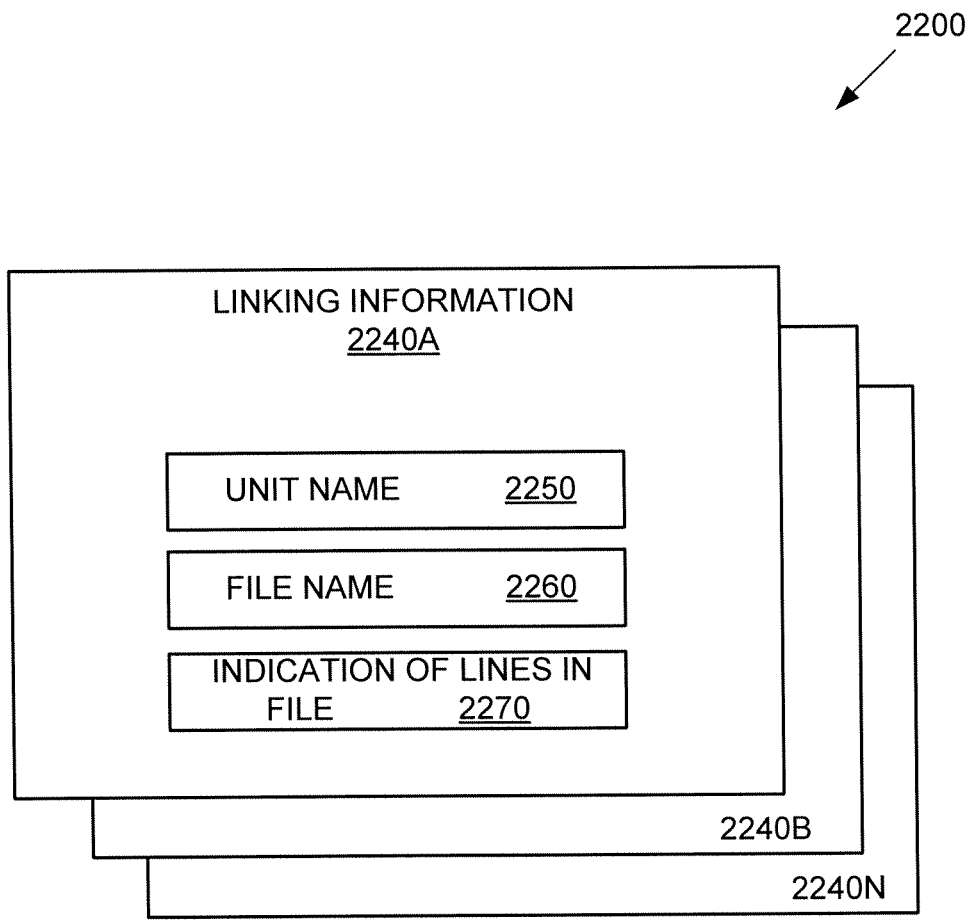
FIG. 22 is a block diagram of an exemplary linking information linking a descriptor to source code.

FIG. 22 is a block diagram of an exemplary data structure 2200 storing linking information 2240A for a code semantics descriptor. Such a data structure can be stored within or separately from the respective code semantics descriptor.

In the example, the linking information 2240A includes a name 2250 of the source code unit described by the related descriptor. Also included is a file name 2260 of a file containing the source code unit and an indication 2270 of lines in the file that make up the source code unit described by the related descriptor.

Other sets of linking information 2240B, 2240N can be stored for respective other code semantics descriptors.

EXAMPLE 30

Exemplary Indexing System

Figure 23:
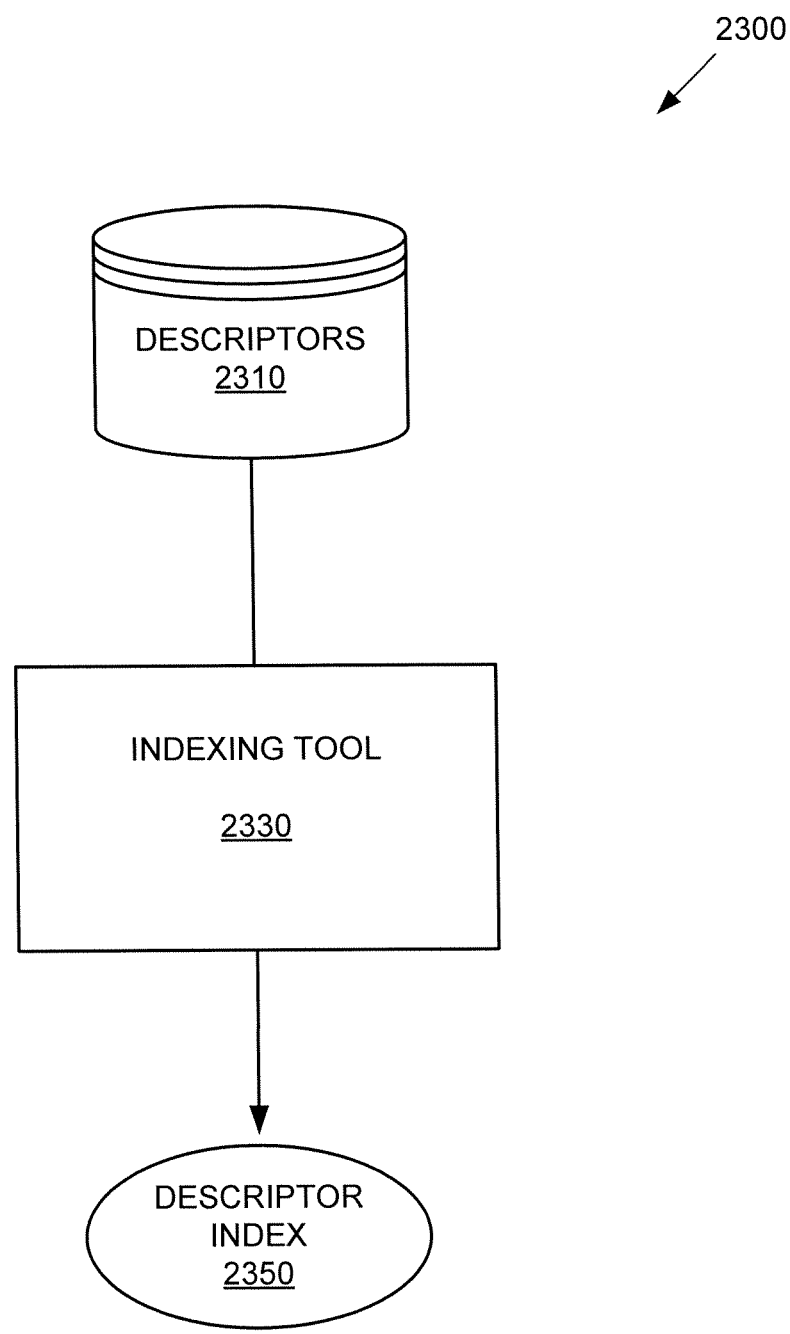
FIG. 23 is a block diagram of an exemplary system for indexing code semantics descriptors.

In order to improve performance of source code semantic search technologies, indexing can be implemented. Thus, in any of the examples herein, query processing can search the code semantics descriptors via an index of the descriptors. FIG. 23 is a block diagram of an exemplary system for indexing code semantics descriptors 2310. In the example, an indexing tool 2330 generates an index 2350 for the descriptors based on the descriptors 2310.

In practice, in any of the examples described herein, instead of directly searching the descriptors 2310, query engines can use the descriptor index 2350 to process the query against the descriptors 2310 (and thus against the source code).

EXAMPLE 31

Exemplary Indexing System

Figure 24:
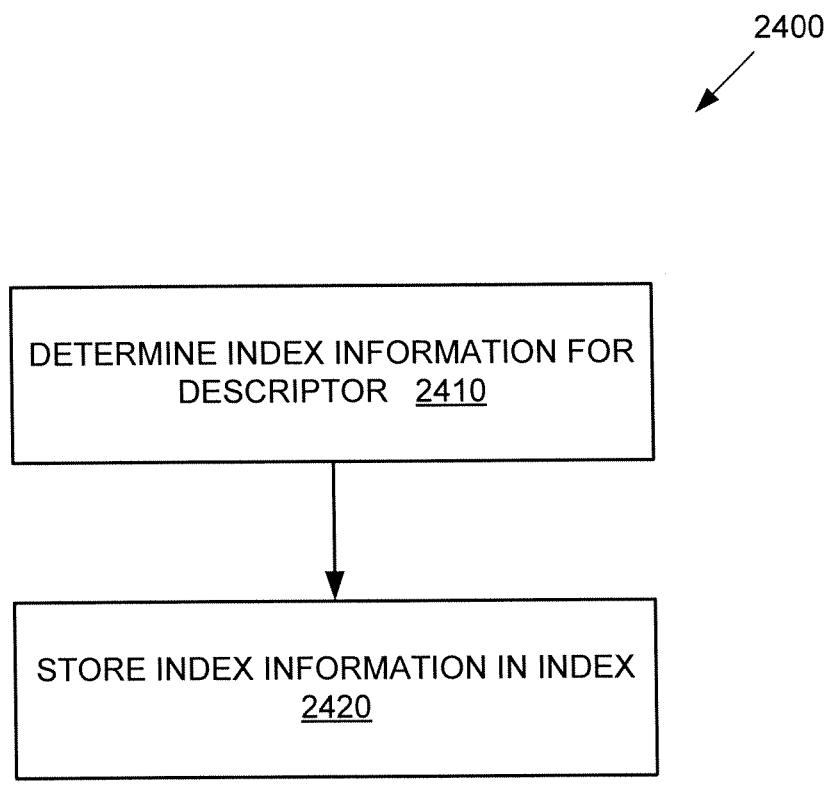
FIG. 24 is a flowchart of an exemplary method for indexing code semantics descriptors.

FIG. 24 is a flowchart of an exemplary method 2400 for indexing code semantics descriptors that can be performed, for example, by the system 2300 of FIG. 23. At 2410, index information is determined for a descriptor, and at 2420 index information for the descriptor is stored in the index.

In practice, such index information can indicate which domain concepts appear in the code semantics descriptor, to allow efficient retrieval of descriptors containing occurrences of a domain concept without having to search the descriptors. The index information can also indicate an operation type performed on the domain concept in the descriptor, to allow efficient retrieval of descriptors containing a particular operation type being performed on a particular domain concept. Any other information appearing in a code semantics descriptor (e.g., location information) can be indexed if desired.

EXAMPLE 32

Exemplary Index

Figure 25:
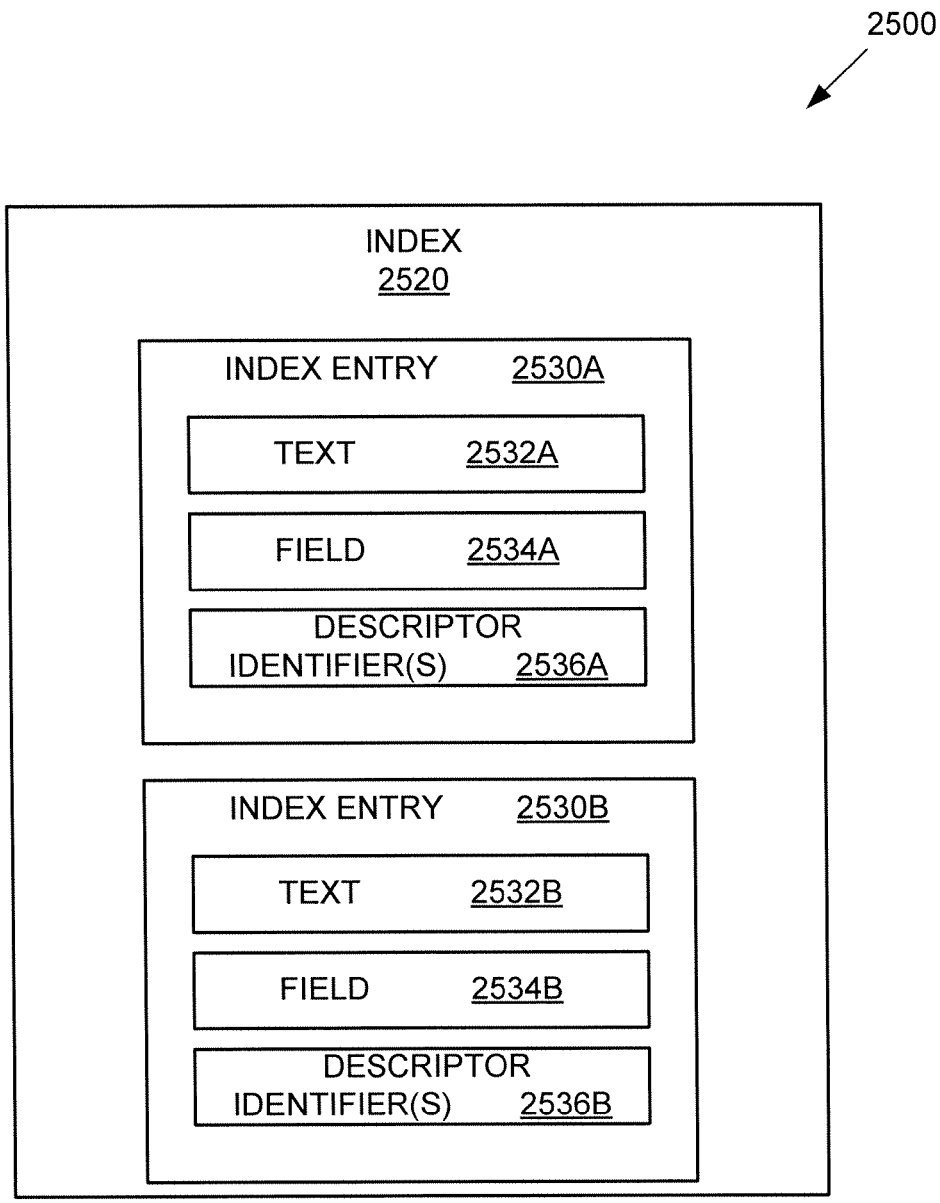
FIG. 25 is a block diagram of an exemplary index for a plurality of code semantics descriptors.

FIG. 25 is a block diagram of a data structure 2500 storing an index 2520 for a plurality of code semantics descriptors. In the example, a plurality of index entries 2530A, 2530B index respective code semantics descriptors.

An index entry 2532A, 2530B can have a field 2532A, 2532B indicating the text (e.g., domain concept, source code unit name, and the like) being indexed. The related code semantics descriptor field 2534A, 2534B (e.g., a keyword indicating any of the exemplary descriptor fields) can also be stored. In order to facilitate efficient location of the descriptor, identifiers of the one or more descriptors in which the text is used in the fields indicated can be stored. Thus, the descriptor can be quickly located. Instead of an identifier, a location (e.g., in a file of descriptors) or another mechanism for locating the descriptor can be specified.

EXAMPLE 33

Exemplary Queries

The technologies can provide a powerful query mechanism by which a query can be used to achieve semantic based querying of source code. FIG. 26A shows an exemplary query 2600 that can be used in any of the examples described herein.

In any of the examples herein, a query 2600 contains one or more domain concept names. Further, for the domain concept names, the query can specify one or more respective operations or operation categories (e.g., "reads," "creates," or the like) or the qualifier "contains."

The query is interpreted as specifying that it is desired to find where within the source code the one or more respective operations are performed on one or more source code element names mapped to the one or more domain concept names. For example, in an implementation using code semantics descriptors, the query is interpreted to specify that those code semantics descriptors having occurrences of the domain concepts in the capacity specified by the operation category are desired.

In any of the examples herein, a query can be a compound query. FIG. 26B shows a compound query 2640, which can be formed by specifying two or more queries joined by a logical operator (e.g., "and," "or," or the like). FIG. 26C shows another version of a compound query 2660 to illustrate that different operations and domain concepts can appear in different parts of the compound query 2660.

In practice, a query can read "update CreditCard, LineItem," which specifies that those source code units (e.g., those code semantics descriptors) in which the domain concepts CreditCard and LineItem are updated are desired. A more complex query can read "update CreditCard, read LineItem and contains Customer." The "contains" qualifier can limit the results to those source code units (e.g., those code semantics descriptors) that contain the domain concept "Customer."

EXAMPLE 34

Exemplary Additional Query Features

Additional features can be implemented in queries to provide more options when querying. For example, an additional qualifier can indicate that a source code unit (e.g., that a code semantic descriptor) must or must not have a particular domain concept name. So, for example, using a special symbol (e.g., "+") indicated for (e.g., in front of) a domain concept name can indicate a "required" domain concept name: only source code units (e.g., as represented by code semantics descriptors) containing the domain concept name are to be returned (e.g., to override query expansion as described herein).

A different special symbol (e.g., "−") indicated for (e.g., in front of) a domain concept name can indicate a "prohibited" domain concept name: only source code units (e.g., as represented by code semantics descriptors) not containing the domain concept name are to be returned. If so, query processing avoid finding source code units in which source code elements mapped to the prohibited domain concept names appear.

EXAMPLE 35

Exemplary System for Querying Source Code

Figure 27:
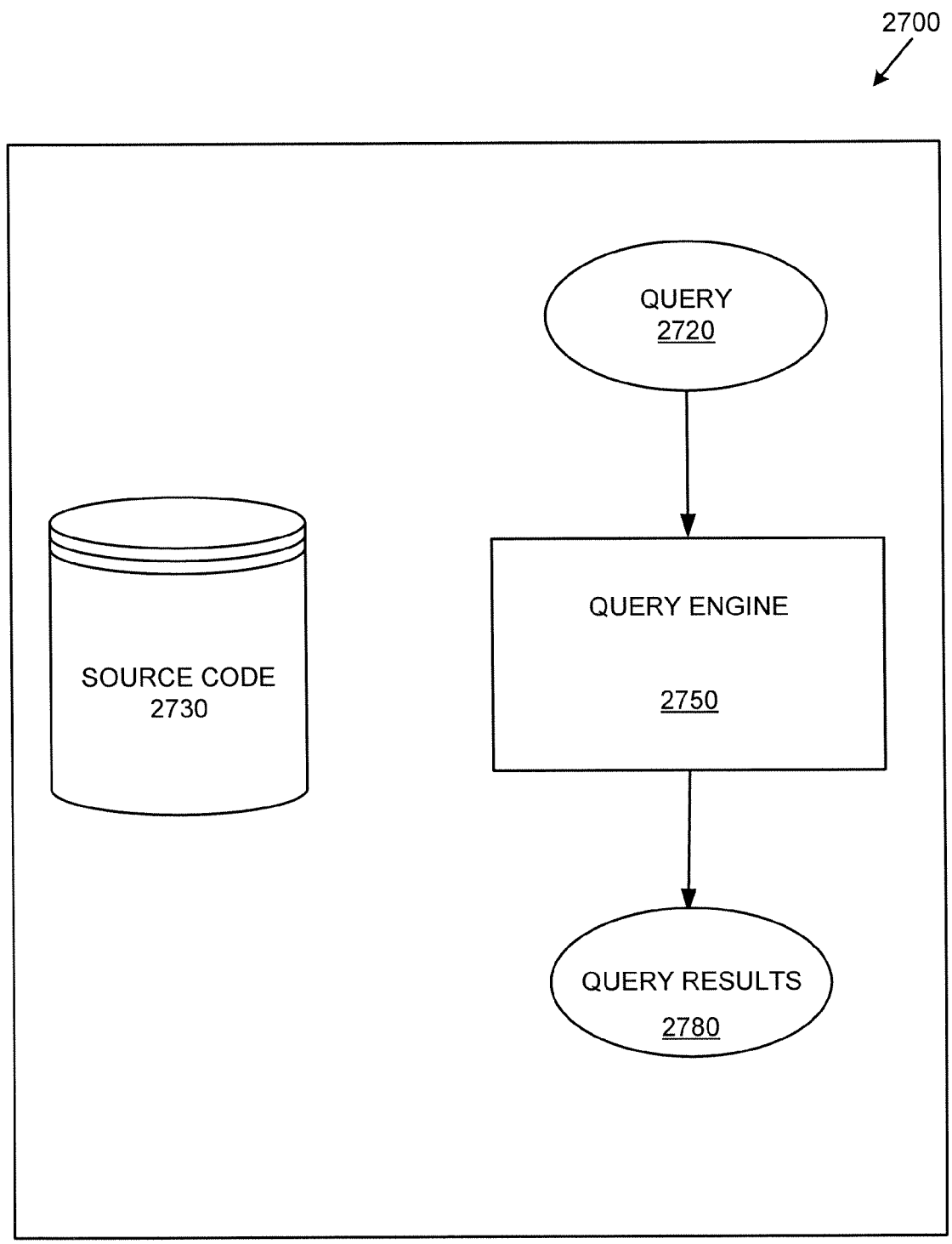
FIG. 27 is a block diagram of an exemplary system for querying source code via a query.

FIG. 27 shows an exemplary system 2700 for querying software source code 2730 via a semantic-based querying technique via query 2720. In the example, a query engine 2750 accepts a query 2720 for the source code 2730 and processes it to generate query results 2780.

17

EXAMPLE 36

Exemplary Method for Querying Source Code

Figure 28:
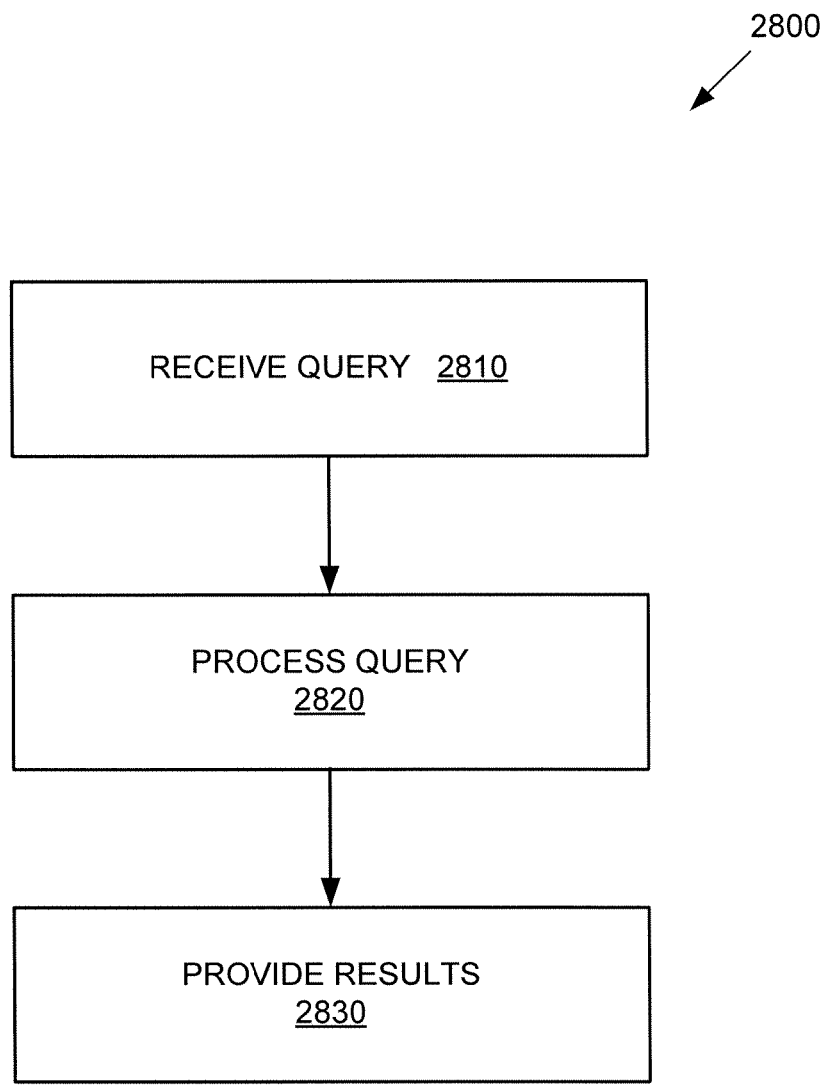
FIG. 28 is a flowchart of an exemplary method for querying source code via a query.

FIG. 28 is a flowchart of an exemplary method 2800 for querying source code via a semantic-based querying technique and can be performed, for example, by the system 2700 of FIG. 27 to achieve the action 440 of FIG. 4. At 2810, a query according to any of the examples described herein is received. As described herein, the query can comprise one or more queried domain concept names and one or more respective operations for the domain concept names.

At 2820, the query is processed. Processing can comprise finding where within the software source code the one or more respective operations are performed on one or more source code element names mapped to the one or more queried domain concept names.

At 2830, results are provided. For example, any of the query result described herein can be displayed or passed to a program for consideration or display.

EXAMPLE 37

Exemplary System for Querying Source Code via Descriptors

Figure 29:
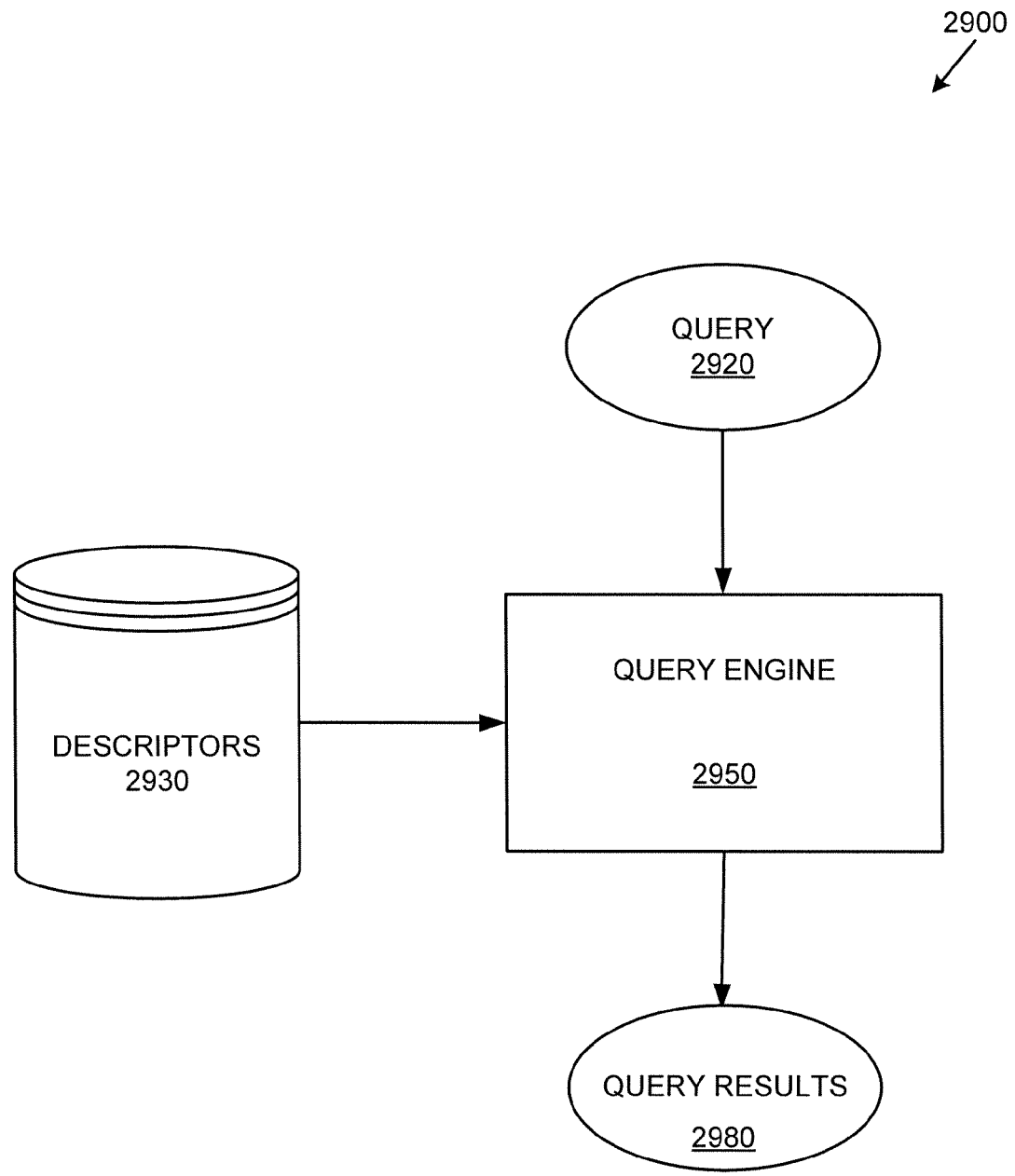
FIG. 29 is a block diagram of an exemplary system for querying code semantics descriptors via a query.

In any of the examples herein, querying can proceed via code semantics descriptors (e.g., without having to directly access the source code). FIG. 29 shows an exemplary system 2900 for querying code semantics descriptors 2930 via a query 2920. In the example, a query engine 2950 accepts a query 2920 and processes it against the code semantics descriptors 2930 to generate query results 2980.

EXAMPLE 38

Exemplary Method for Querying Source Code via Descriptors

Figure 30:
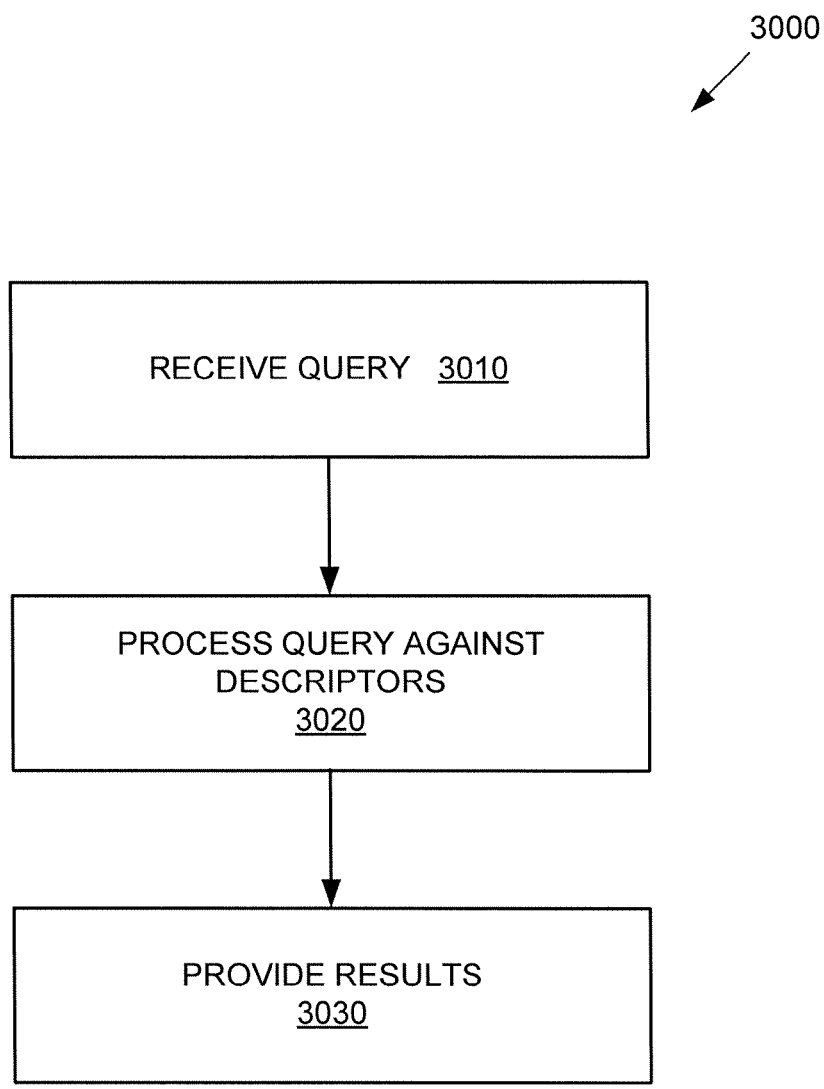
FIG. 30 is a flowchart of an exemplary method for querying code semantics descriptors.

FIG. 30 is a flowchart of an exemplary method 3000 for querying code semantics descriptors and can be performed, for example, by the system 2900 of FIG. 29 to achieve the action 440 of FIG. 4. At 3010, a query according to any of the examples described herein is received. At 3020, the query is processed against the descriptors to find those descriptors that satisfy the query conditions. At 3030 results are provided. For example, an indication of those descriptors satisfying the query conditions can be provided as output.

EXAMPLE 39

Exemplary System for Query Expansion

Figure 31:
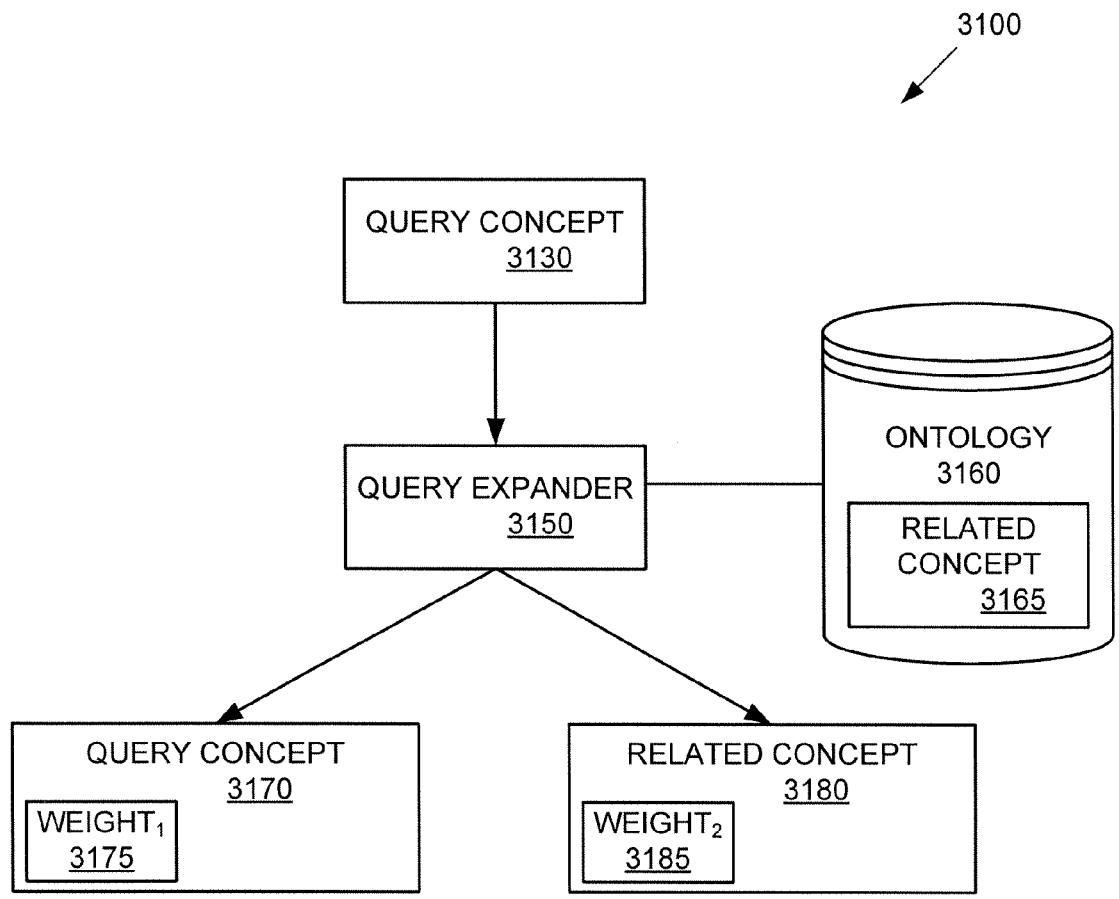
FIG. 31 is a block diagram of an exemplary system for expanding queries.

In any of the examples described herein, query expansion can be performed to provide additional results that can be helpful when performing queries with semantic search techniques. FIG. 31 shows an exemplary system 3100 for expanding queries. In the example, a query concept 3130 can be processed by a query expander 3150 to result in a weighted version of the query concept 3170 with a weight 3175 and a related concept 3180 with a different weight 3185. The query expander 3150 can use the ontology 3160 to find the related concept 3165 (which is used for the weighted version of the related concept 3180). Although weights 3175 and 3185 are shown for the two concepts, a weight can be implied (e.g., no weight means a default weight, such as one).

18

EXAMPLE 40

Exemplary Method for Query Expansion

Figure 32:
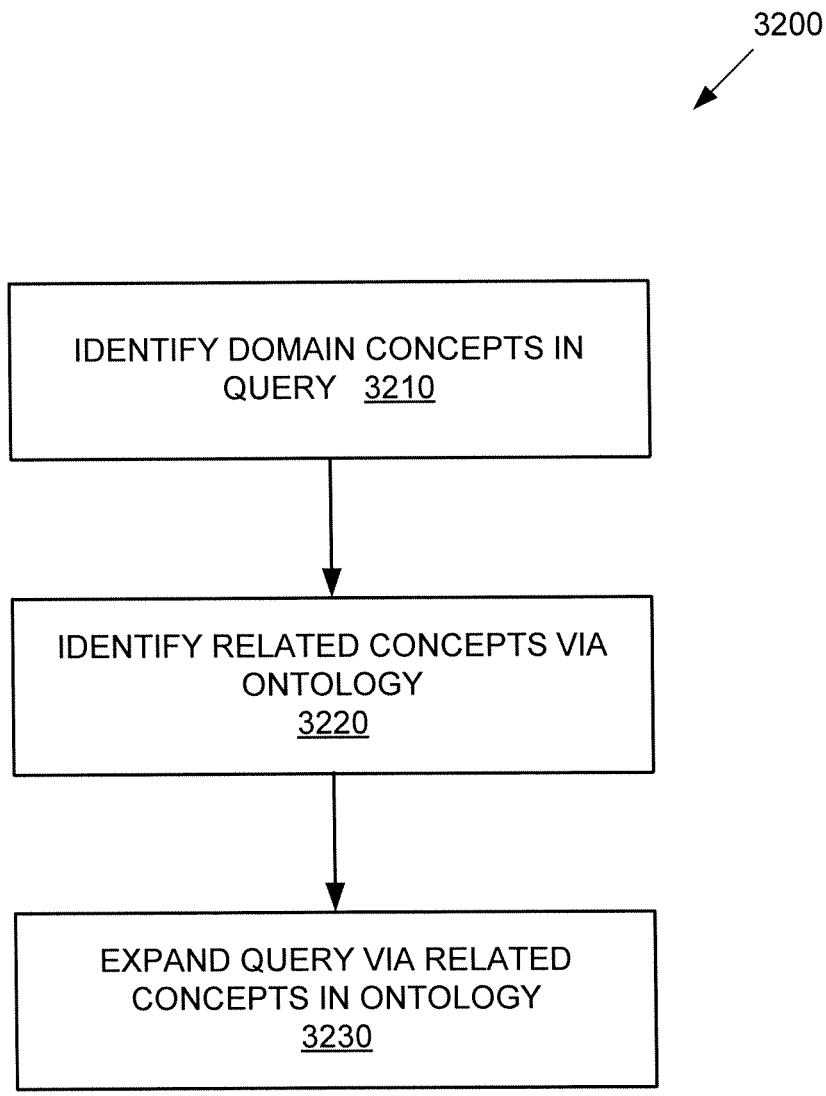
FIG. 32 is a flowchart of an exemplary method for expanding queries.

FIG. 32 shows an exemplary method 3200 for expanding queries and can be performed, for example, by the system 3100 shown in FIG. 31 to achieve query expansion during query processing in any of the examples herein. In any of the examples herein, queries can be expanded via an ontology.

At 3210, domain concepts are identified in the query. For example, due to query format, the domain concepts can be expected to appear in a particular part of the query. At 3220, concepts related to the domain concepts in the query can be identified via an ontology. For example, synonyms can be identified. Or, another domain concept related to the domain concept (e.g., via a relationship such as "is-a," "has-a," "uses," or the like) can be identified. The query can then be expanded based on the related concepts in the ontology.

Based on the relationship, a different weight can be assigned. Thus, expanded query concepts can have a weight assigned that is different from weights for concepts specified in the query. For example, the "is-a" relationship can result in a weighting that is a fraction (e.g., half) of that for the concept specified in the query. A "has-a" or "uses" relationship can result in a weighting that is a different fraction (e.g., one-quarter) of that for the concept specified in the query. In practice, any variety of weights can be used. For example, a weighting of eight (8) can be specified for the concept specified in the query so that halving and quartering can be easily performed.

Although possible, expansion is typically not applied to the domain concepts that result from the expansion. If such an approach is taken, a limit on the number of expansion iterations can be used.

Alternatively, the descriptors or the descriptor index can be expanded to avoid having to expand the queries.

EXAMPLE 41

Exemplary Techniques for Resolving Queries

Certain combinations of query features may result in potentially ambiguous results, so rules can be applied to resolve such ambiguities. For example, when a "required" domain concept is expanded, the domain concepts resulting from the expansion can be interpreted as not required.

When a "prohibited" domain concept is expanded, the domain concepts resulting from the expansion can themselves be interpreted as also prohibited.

If two concepts are indicated as both prohibited and required due to expansion, the one with the greater weight is favored. In the case of equal weights, prohibited concepts can be favored.

EXAMPLE 42

Exemplary Query Results

In any of the examples described herein, query results of a semantic search technique can be displayed for consideration by a user. Such results can take any of a variety of forms and have any of a variety of information.

Figure 33:
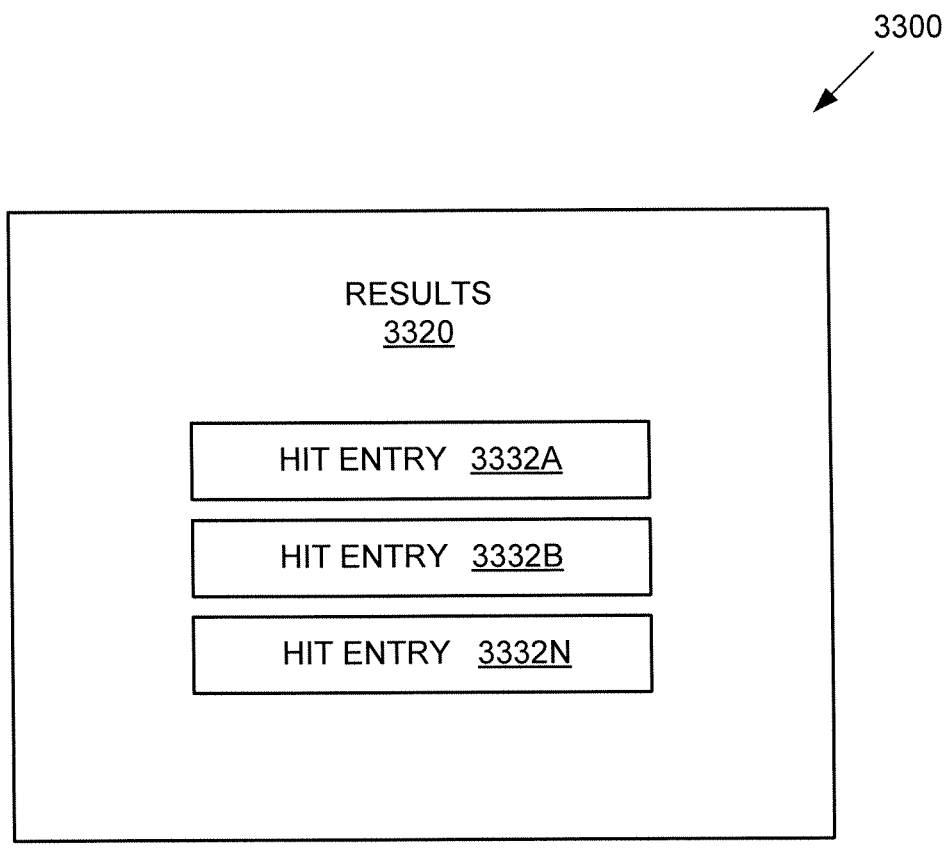
FIG. 33 is a block diagram of exemplary query results.

FIG. 33 shows a user interface 3300 displaying query results 3320 as a set of one or more hit entries 3332A-3332N. The hit entries 3332A-3332N can indicate respective locations in the source code where the one or more respective operations specified in a query are performed on one or more source code element names mapped to the one or more queried domain concept names. For example, a file name, component, method name, line number, the like, or a combination thereof can be specified.

The results can comprise a list of methods in the source code within which the one or more respective operations in a query are performed on one or more source code element names mapped to the one or more queried domain concept names.

The hit entries 3332A-3332N can correspond to respective code semantics descriptors for the source code being searched.

EXAMPLE 43

Exemplary Query Hit Entries

Figure 34:
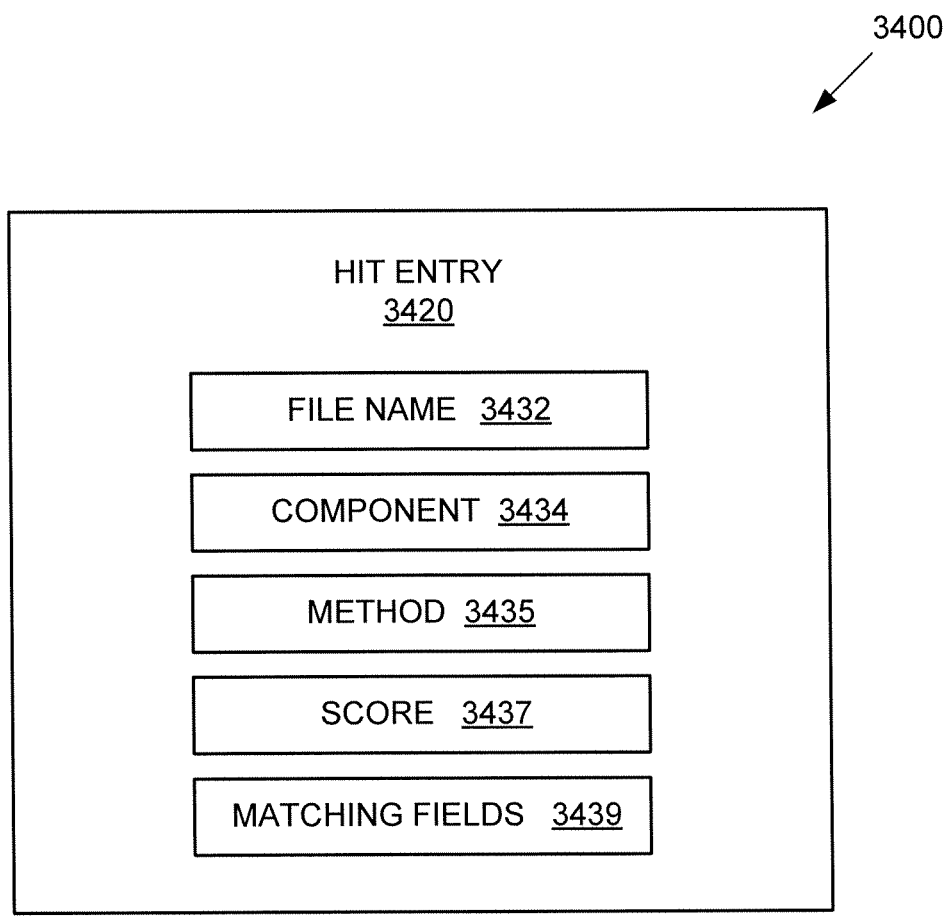
FIG. 34 is a block diagram of an exemplary query hit entry.

FIG. 34 shows an exemplary user interface 3400 showing a hit entry 3420. In the example, the hit entry contains a file name 3432, a component (e.g., name of the class definition in which the source code appears) 3434, a method 3435, a score 3437 (e.g., based on weights of the terms), and the matching fields 3439.

The component 3434 can specify the name (e.g., a domain concept or name used in the source) of the class definition in which the source code appears.

The matching fields 3439 can indicate a description of the one or more respective operations performed on one or more source code element names mapped to the one or more queried domain concept names.

In practice, the hit entries can be displayed as shown in the user interface 3500. File names and components can be depicted as hyperlinks so that a user can easily navigate to the file name or component indicated. So, responsive to activation of the file name, the source code environment navigates to the file (e.g., in a source code editor). Similarly, responsive to activation of the component name, the source code environment navigates to the component definition (e.g., in a source code editor).

EXAMPLE 44

Exemplary Execution of Ontology Creation

Figure 36:
FIG. 36 is a screenshot of an exemplary set of class definitions for a class hierarchy.

As described herein, ontology creation can be achieved by using software design artifacts. For example, a class hierarchy can be used to create an ontology. FIG. 36 shows an exemplary object class hierarchy 3600 for applications in the domain of pet store software from which an ontology can be created. The design artifacts used to create an ontology can be from applications that have been implemented, but need not be. For example, an expert in the particular domain can assemble a design artifact thought to embody best practices, even if the specified software is not ever implemented.

In the example, the class hierarchy 3600 includes parent classes (e.g., "customer") and child classes (e.g., "premium-Customer"). Under the principles of object-oriented programming, a child class inherits characteristics of its parent.

Also shown are template slots (e.g., data members) of the class definition. The template slots can themselves be an object class or any other supported data type (e.g., string, integer, float, or the like).

Figure 37:
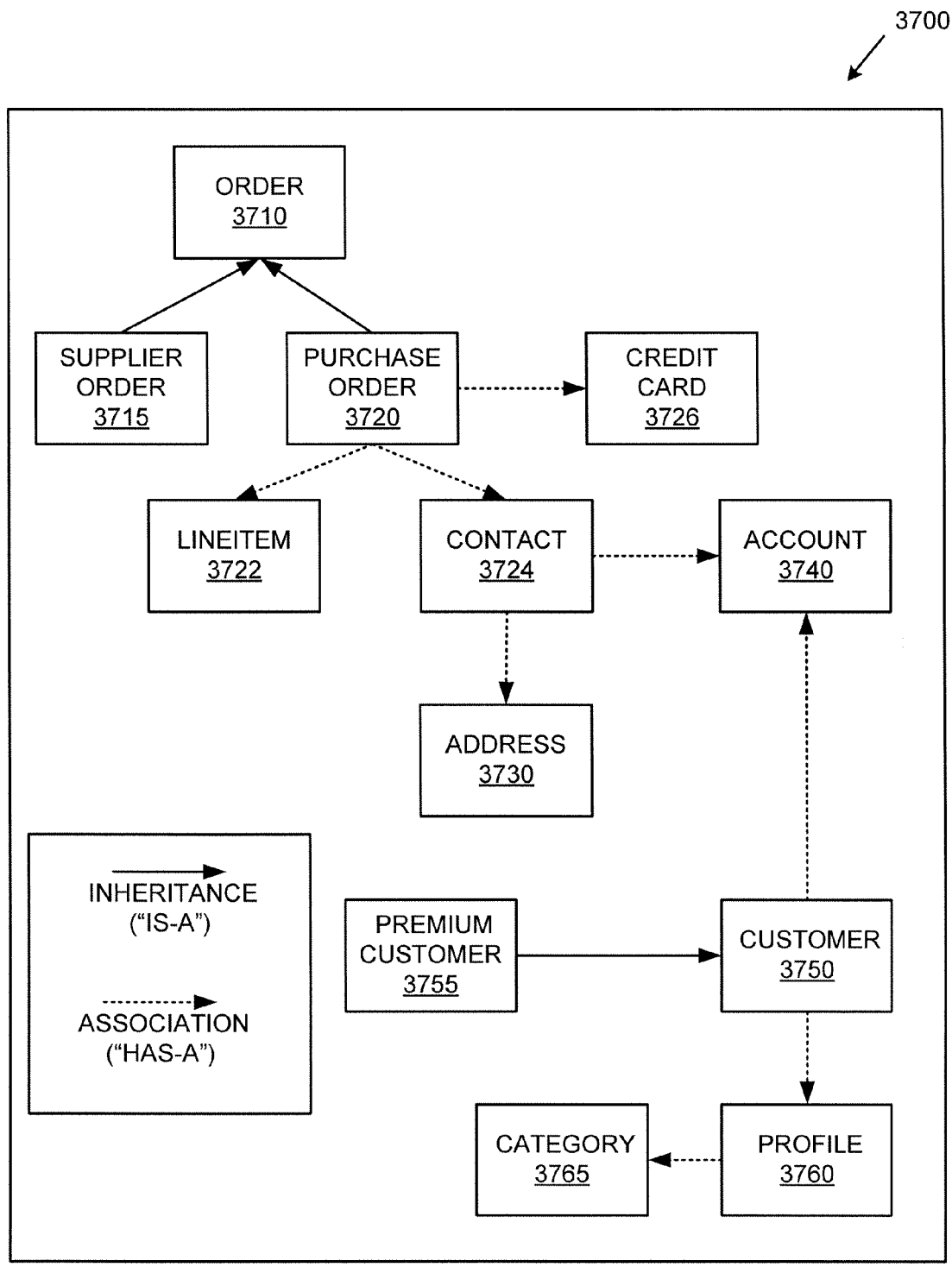
FIG. 37 is a block diagram of an exemplary ontology created based on the class hierarchy of FIG. 36.

FIG. 37 is a block diagram of an exemplary ontology 3700 created based on the class hierarchy of FIG. 36. In the example, the object classes and other data types are represented as domain concepts 3710, 3715, 3720, 3722, 3724, 3726, 3730, 3740, 3750, 3755, 3760, 3765. In the example, two types of relationships between concepts are present: inheritance relationships in the class hierarchy are implemented as an "is-a" relationship and association relationships (e.g., in a slot for the class definition) are implemented as a "has-a" relationship. Consequently, such relationships can be used when expanding queries as described herein.

EXAMPLE 45

Exemplary Execution of Mapping Source Code Elements to Domain Concepts

As described herein, source code elements can be identified and mapped to domain concepts. FIG. 38 is an exemplary snippet 3800 of Java source code having source code elements that can be mapped to domain concepts appearing in an ontology, such as the ontology shown in FIG. 37. In the example, the class OrderFulfillment has a method processAnOrder that takes a parameter of type SupplierOrder, returns a String, and uses a local variable of type LineItemLocal.

In the example, the following source code elements appear: the data types OrderFulFillment, SupplierOrder, LineItemLocal, and TPAInvoice; and the method names processAnOrder, getQuantity, and setQuantity. getQuantity and setQuantity are member functions of the LineItemLocal type.

In any of the examples herein, the name of the method (e.g., processAnOrder) and the other elements associated with the method can hold some clue to the purpose of the method. For example, processAnOrder uses the domain concepts SupplierOrder and Line Item. Further, the method is part of OrderFulFillment, which might be involved in various operations related to an Order. Thus, it is possible to discover that processAnOrder uses variables of type LineItemLocal and SupplierOrder. So, the source code elements can be associated to the domain ontology of FIG. 37.

Table 2 shows a possible mapping between domain concepts (e.g., based on the ontology started in FIG. 37) and source code elements in the snippet 3800.

TABLE 2

| Exemplary Mapping | |
|---|---|
| Domain Concept Name | Source Code Element |
| Order | OrderFulFillment |
| SupplierOrder, Order | processAnOrder, SupplierOrder |
| LineItem | LineItemLocal, processAnOrder |
| Invoice | TPAInvoice |
| LineItem.Quantity | LineItemLocal.getQuantity, LineItemLocal.set Quantity |

Although not shown, the code can elsewhere include elements mapped to other concepts, such as "product," "creditcard," and the like.
The mapping shown in Table 2 can be implemented as synonyms. For example, LineItemLocal can be a synonym for the concept LineItem. Similarly, TPAInvoice can be a synonym for the concept Invoice.

EXAMPLE 46

Exemplary Execution of Code Semantics Descriptor Generation

FIGS. 39A-B are data structures 3900, 3950 showing exemplary code semantics descriptors. In the examples, a special character (e.g., "@") is used to specify the beginning of entries within the descriptor. A special keyword (e.g., "SUMMARY") is used to denote the beginning of a summary of the descriptor. The keyword "uses" specifies which domain concepts appear in the method described by the descriptor. The keyword "performs" indicates the operations performed on domain concept names and can specify any of the exemplary operations described herein (e.g., update, create, delete, read, and the like). The keyword "involved-in" specifies the name of the object class in which the method appears. The keyword "element" can be used to specify a location. For example, the "module" keyword specifies in which module (e.g., package) the method appears; the "service" keyword specifies the method described by the descriptor.

The "Line#" keyword indicates a line number at which the method starts, and the "File" keyword indicates a file name (e.g., package name) in which the method appears.

The keyword "DETAIL FLOW" denotes that a more detailed description of operations performed by the method in terms of domain concepts follows.

In practice, different or additional keywords can be implemented by the descriptors.

EXAMPLE 48

Exemplary Query Results

As described herein, query results can be displayed. Table 4 shows exemplary query results that can be displayed for a query on the domain concept "Order." In the example, a file name provides a hyperlink to the file in which the method appears, component specifies the object class in which the method appears, service specifies the method, score specifies a score (e.g., based on weighting), and matching fields specifies the operations performed.

In the example, the matching fields can use a different color for different matching fields. For example, "uses" can be one color, "updates" can be another, and "reads" can be another.

TABLE 4

Exemplary Query Results

| File Name | Component | Service | Score | Matching Fields |
|---|---|---|---|---|
| ..\src\com\sun\j2ee\blueprints\xmldocuments\OrderApproval.java | OrderApproval | addOrder | 99% | Uses, Updates, Reads |
| ..\src\client\com\sun\j2ee\blueprints\admin\client\HttpPostPetStoreProxy.java | HttpPostPetStoreProxy | updateStatus | 78% | Uses, Updates |
| ..\src\apps\supplier\src\com\sun\j2ee\blueprints\supplier\orderfulfillment\ejb\OrderFulfillmentFacadeEJB.java | OrderFulfillmentFacadeEJB | processPO | 60% | Uses |
| ..\src\apps\admin\src\client\com\sun\j2ee\blueprints\admin\client\PetStoreProxy.java | PetStoreProxy | getOrders | 45% | Uses, Reads |
| ..\src\apps\supplier\src\com\sun\j2ee\blueprints\supplier\inventory\web\RcvrRequestProcessor.java | RcvrRequestProcessor | Send-Invoices | 25% | Uses |

EXAMPLE 47

Exemplary Code Semantic Descriptor Index

As described herein, code semantic descriptors can be indexed. Table 3 shows an exemplary index structure constructed for the code semantic descriptors 3900, 3950 of FIG. 39. In the example, a "text" entry indicates keywords appearing in the code semantic descriptor, the "field" entry indicates in which field the keyword appears, and the "descriptor id" field identifies the descriptor. The "text" entry can also indicate what operation is being performed (e.g., update or the like).

TABLE 3

Exemplary Descriptor Index Structure

| Text | Field | Descriptor Id |
|---|---|---|
| Inventory | Uses | Identifier for descriptor 3950 |
| LineItem | Uses | Identifiers for descriptors 3900 and 3950 |
| LineItem.getQuantity | Calls | Identifier for descriptor 3950 |
| Update Inventory | Performs | Identifier for descriptor 3950 |
| Update SupplierOrder.Quantity | Performs | Identifier for descriptor 3900 |
| OrderFulFillment | Component | Identifiers for descriptors 3900 and 3950 |

EXAMPLE 49

Exemplary Formal Definition of an Ontology

As described herein, an ontology can include relationships between domain concepts represented in the ontology. The ontology can be implemented as a directed graph in order to identify domain concepts and their related concepts. The ontology graph can be represented as ONG=<V, E, Γ>, where V is the set of nodes that represents domain concepts and E is the set of edges that represents relations between concepts. The relationship function Γ:E->{I, A} assigns either an inheritance (I) or an association (A) relationship type to each edge. For example, in the graph shown in FIG. 37, the edge <Order 3710, Supplier Order 3715> represents an inheritance relationship, and <Purchase Order 3720, Contact 3724> represents an association relationship. For such an ontology graph, a Relevant-Concept subgraph (or Relevance subgraph) of depth N, rooted at the concept node r can be defined as follows:

ONG-R (N, r)=($V_r$, $E_r$) where $V_r \subseteq V$, $E_r \subseteq E$, rooted at the node r such that $V_r = \{r\} \cup V^I_r \cup V^A_r$, where $V^I_r = \{v_i | v_i$ is reachable from r only through inheritance edges in $\leq$N steps$\}$, $V^A_r = \{v_a | v_a$ is reachable from r only through association edges in 1 step$\}$, $E_r = \{(u,v) | u,v \in V_r, \Gamma(u,v)=I\} \cup \{(r,v_a) | v_a \in V^A_r, \Gamma(r, v_a)=A\}$.

In this context, the immediate successor and predecessor operators applied to ONG-R can be defined as follows:

succ(u) is the successor operator that returns the set of successor nodes of any node $u \in V^I_r$ reachable in 1-step from u in the subgraph ONG-R through inheritance edges.

pred(u) is the predecessor operator that returns the set of immediate predecessors of $u \in V^I_r$ through inheritance edges.

EXAMPLE 50

Exemplary Weights Calculated via Formal Definition of Ontology

As described herein, queries can be expanded via the ontology. For example, relevant domain concepts can be discovered and weights calculated. For a given query term τ, the tool can first identify the ontology concept node r in ONG that represents τ. Subsequently, the concepts relevant to r can be obtained by traversing ONG starting from the node r and creating the Relevance subgraph ONG-R(N,r). Following are the possible scenarios for weight calculation:
1. Traversal through Relevance subgraph through inheritance relationships.
2. Traversal through association relationships from r.

In each scenario, the weights of the relevant concept nodes can be calculated with respect to an initial weight of the node r. The initial weight of r can be denoted as $\omega^i(r)$.

Inheritance relationships can be traversed. In such a scenario, the tool can traverse ONG-R(N,r) along the inheritance edges starting from r and calculate the weights using the following rules:
1. The weight of each successor node $u \in succ(r)$ is $\omega(u)=\omega^i(r)/2$.
2. Extending this concept for any depth k(1<k≤N), the weight of any intermediate node v is: $\omega(v)=Max\{\omega(u)/2 | \forall u \in pred(v)\}$. This can be easily calculated by performing a breadth-first-search on ONG-R starting from r.

For instance, when a user searches for a term τ=Order, the inheritance subgraph ONG-R(Order) rooted at Order is identified with successor nodes "SupplierOrder" and "PurchaseOrder" (refer to FIG. 1). The weights ω(SupplierOrder)=ω(PurchaseOrder)=$\omega^i$(Order)/2. If there were a child of PurchaseOrder, the weight of the term would be set to $\omega^i$(Order)/4.

Traversal through association relationships can also be achieved. In such a scenario, the set of nodes $V^A_r$ of ONG-R can be considered. Here the weight of each node $v_a \in V^A_r$ can be calculated as $\omega(v_a)=\omega^i(r)/2$. Thus, for "PurchaseOrder", ω(LineItem)=, ω(Contact)=ω(CreditCard)=$\omega^i$(PurchaseOrder)/2.

Related concepts can overlap. There can be query terms $\tau_1$ $\tau_2$ for which one or more related domain concepts may be common. ONG-R1 and ONG-R2 may have some common nodes. In such a case, the final weight of the common node c can be considered to be the maximum of all of the weights of c obtained by considering each query term individually.

The required and prohibited qualifiers can have impact. The required (+) and prohibited (−) qualifiers associated with the query terms can be propagated to the related domain concepts obtained by traversing the subgraph ONG-R. The propagation rules can be as follows:
1. Non-propagation of +: If a term τ has +, the ontology concept node r that represents τ also possesses +. However, + is not propagated to any of the related concepts of r obtained by traversing ONG as described herein.
2. Propagation of −: If a term τ has −, concept node r that represents τ also possesses −. The prohibited qualifier − is propagated to all the related concepts in ONG-R(N,r). Furthermore, immediate successors of r through association relationships (e.g., described herein) are not even considered as concepts relevant to r.
3. Conflict Resolution: If a concept r is reached by two paths where one path causes r to have + and the other causes r to have −, the path that contributes to higher weight is considered and the qualifier corresponding to that path becomes the qualifier of r. In case of equal weights, the − qualifier is preferred over the + qualifier.

A variety of other approaches are possible. If desired, a user interface for configuring weighting behavior can be provided.

EXAMPLE 51

Exemplary Web Interface

In any of the examples described herein, the technologies can be implemented via a web interface. For example, queries can be specified via web forms, and results can be returned as web pages. Hyperlinks can be used to navigate to source code.

EXAMPLE 52

Exemplary Queries

Exemplary queries can take a variety of forms. For example, "update CreditCard, LineItem" can be used to retrieve all source code units or source code descriptors that perform update operations on the domain concepts CreditCard and LineItem. Another query may read, "update CreditCard, read LineItem, contains Customer" which would search to see if the domain concept "Customer" appears (e.g., in a code semantics descriptor for the source code unit).

A query "updates CreditCard,LineItem but not Order" can be specified. A query "− reads customer, updates credit card" specifies that occurrences (e.g., in the source code or code semantics descriptors) where credit card is updated and customer is not read are desired.

A query need not specify an operation (e.g., update or the like). For example, "+PurchaseOrder−Account" can specify that occurrences where PurchaseOrder appears but Account does not are desired.

EXAMPLE 53

Exemplary Implementation of Query Expansion

Any of the query expansion techniques described herein can be used in any of the examples described herein. For example, a query may contain the domain concept "customer" when using the ontology 3700 of FIG. 37. The query can be expanded to add "premiumcustomer" to ensure that the results contain all types of customers. however, the priority given to the term "premiumcustomer" can be less than that for "customer."

In one form of query expansion, the domain concept "customer" specified in the original query can be expanded to include customer with a weight x, where x is any integer (e.g., 16, 8, 4, or the like). Concepts (e.g., "premiumcustomer") having an "is-a" relationship to the original domain concept can be added with a weight of x/2. Concepts (e.g., "account") having a "has-a" relationship to the original domain concept can be added with a weight of x/4. Thus, a query "updates creditcard reads customer" is expanded to "updates creditcard^8 cardtype^2 premiumcustomer^4 account^2 expirydate^2 cardnumber^2 reads customer^8 profile^2." In the expanded query, "^" indicates a weight given to the term in the query. The operations are considered only on the main query term. The expanded query terms do not have the operations added to them in the format shown in the example, even though the query can still require the operations be performed on the expanded terms. For example, the query format could instead read, "updates:creditcard^8 OR cardtype^2 OR premiumcustomer^4 OR account ^2 OR expirydate^2 OR cardnumber^2 AND reads: customer^8 OR profile^2."

Conflict can arise when Boolean operators are provided in the query. So, a query may read "−reads customer updates creditcard" which indicates that occurrences where the keyword "creditcard" is updated and "customer" is not read are desired. When expanding the query, the ontology relationships for "credit card" can be added, but the added terms will be considered option (e.g., without the required operator). However, for the prohibited operator, the "is-a" related concepts, if any, of "customer" can use the prohibited operator. Thus, the expanded query can be "+update credit card^8 cardtype^2 −premiumcustomer^4 expirydate^2 cardnumber^4 −customer^8." When a term in the ontology is considered due to multiple query terms, the operator chosen (e.g., required or prohibited) will be based on the weight propagated from multiple query terms. When the weights add up to zero, the prohibited operator has priority). For example, a query "+PurchaseOrder −Account" when expanded can be expanded with prohibited on the term "Contact" because the prohibited operator of "Account" can be given higher weight.

EXAMPLE 54

Exemplary User Interfaces

Figure 40:
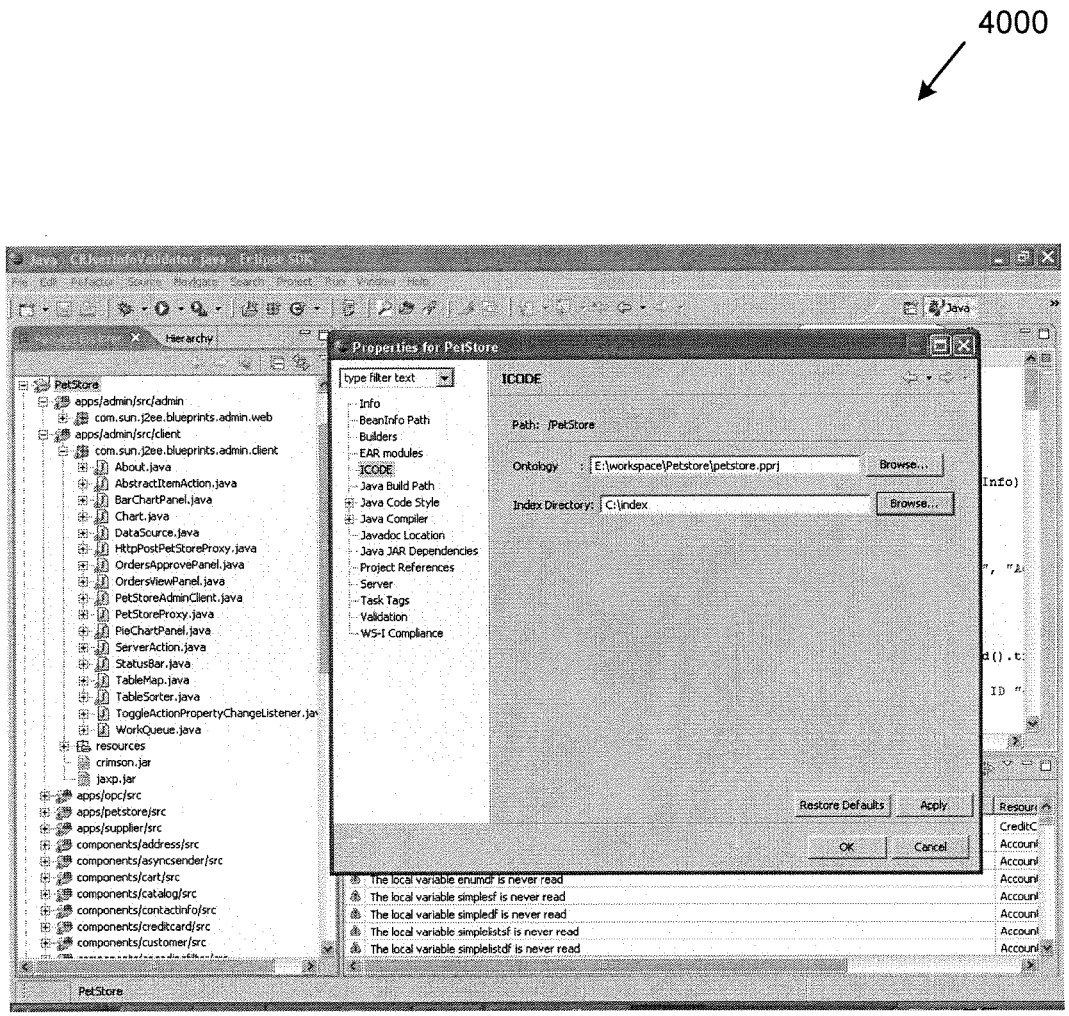
FIG. 40 is a screen shot of an exemplary user interface for specifying an ontology for use by a semantic-based query tool.

FIG. 40 is a screen shot of an exemplary user interface 4000 for specifyingan ontology for use by a semantic-based query tool and can be presented in a code development environment. In the example, a user can enter the name and location of an ontology file in the ontology box. A directory for an index (e.g., where code semantics descriptors and a related index can be stored) can also be specified in the index box.

Figure 41:
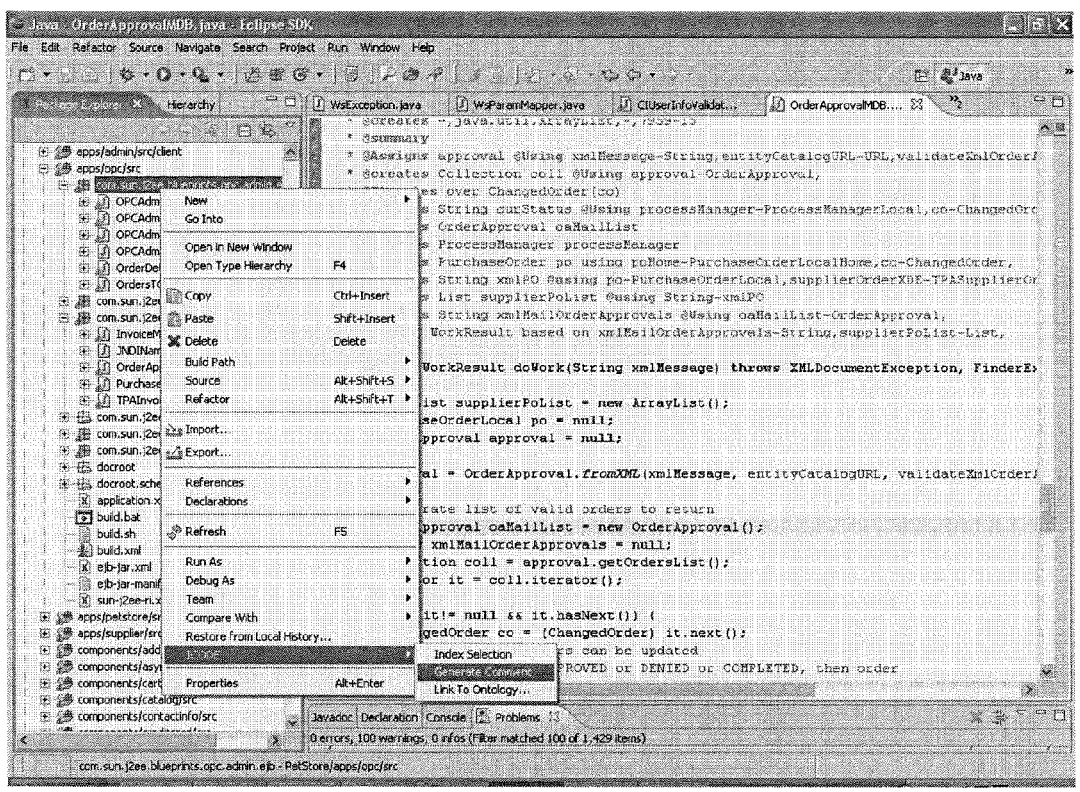
FIG. 41 is a screen shot of an exemplary user interface for performing semantic-based querying tasks.

FIG. 41 is a screen shot of an exemplary user interface 4100 for performing semantic-based querying tasks and can be presented in a software development environment. A menu includes an option for indexing a selection (e.g., generating a code semantics descriptor for the selection), generating a comment (e.g., inserting a code semantics descriptor as comments), and linking to an ontology (e.g., mapping a source code element to a domain concept in the ontology).

Figure 42:
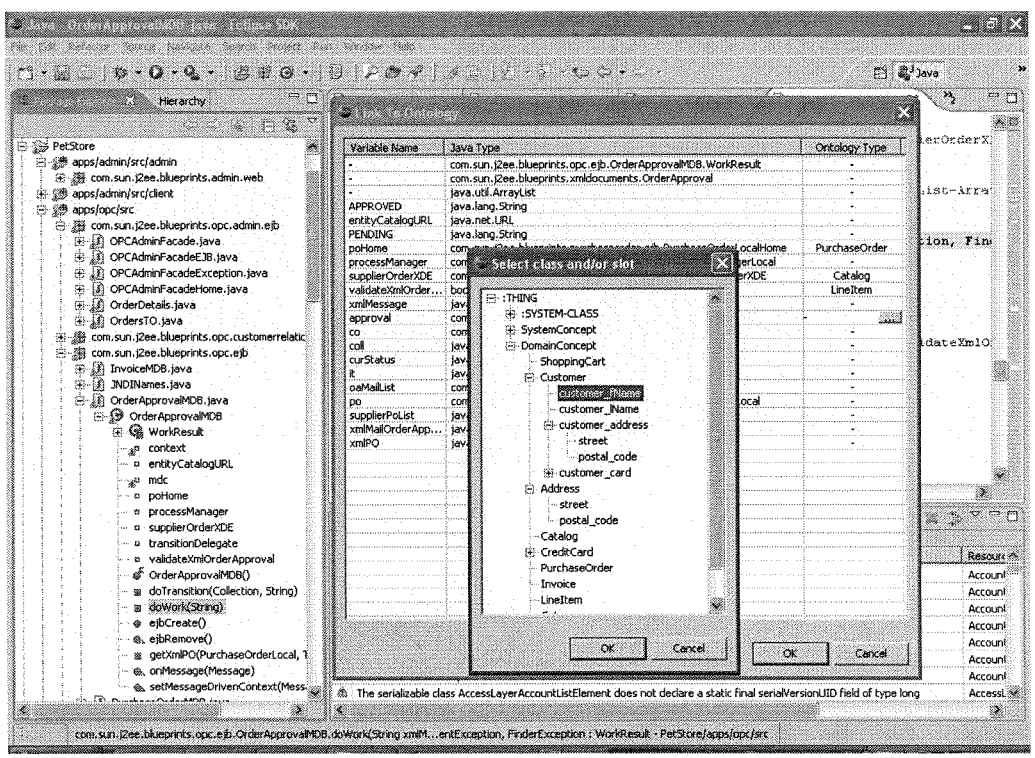
FIG. 42 is a screen shot of an exemplary user interface for mapping source code elements to domain concepts in an ontology.

FIG. 42 is a screen shot of an exemplary user interface 4200 for mapping source code elements to domain concepts in an ontology. In the example, the user can click select a variable name (e.g., with a variable type) and link it to a domain concept. The selected domain concept is then mapped to the source code element (e.g., the variable type and thus to the variable name).

EXAMPLE 55

Exemplary System

Figure 43:
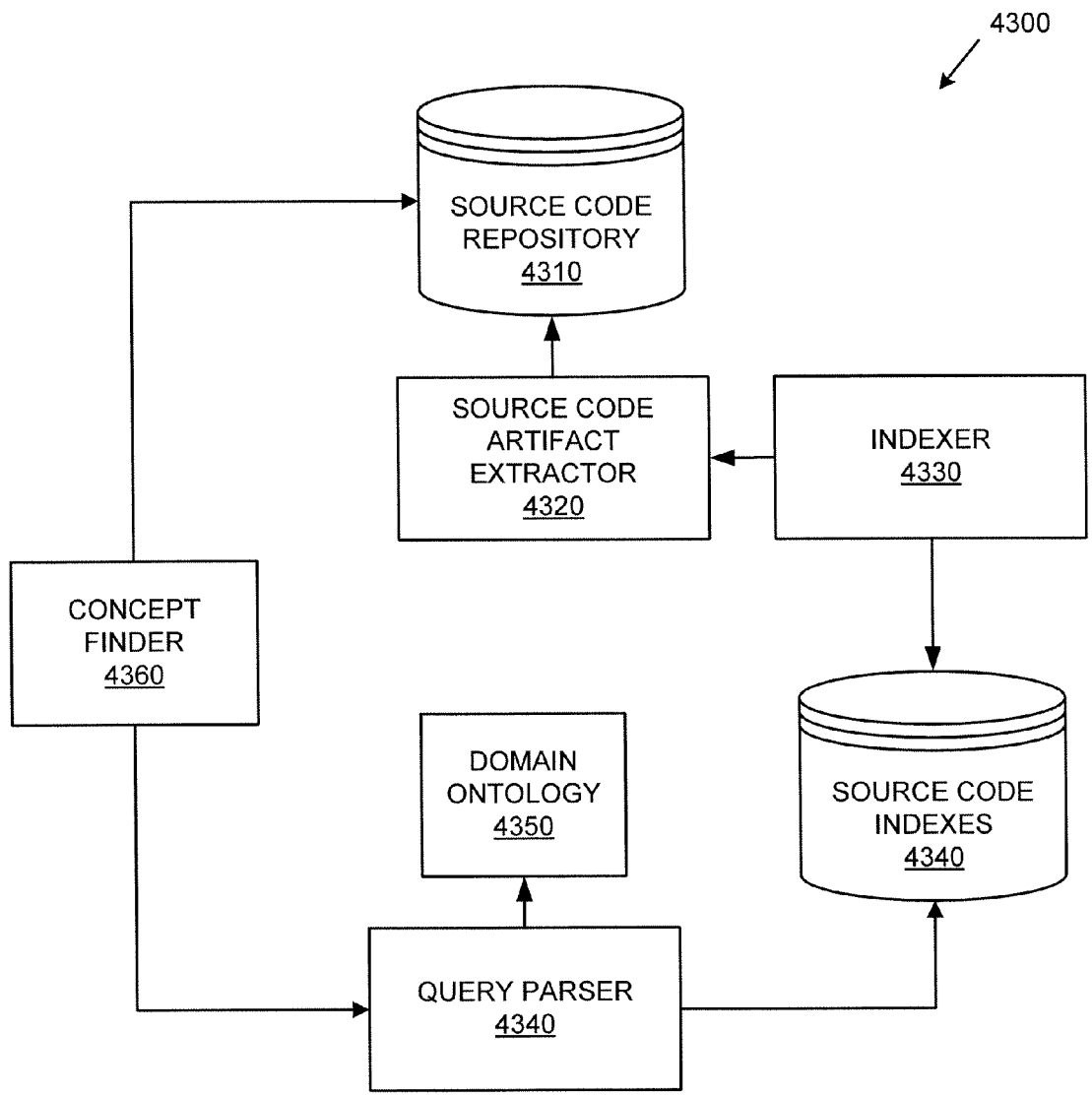
FIG. 43 is a block diagram of an exemplary system for carrying out the technologies described herein.

FIG. 43 is a block diagram of an exemplary system 4300 for carrying out the technologies described herein. In the example, a source code artifact extractor 4320 extracts source code elements from the source code repository 4310. The concept finder 4360 links the domain ontology 4350 to the source code repository 4310 and accepts queries, which is passes to the query parser 4340.

The query parser4340 searches the source code indexes 4340 (e.g., code semantic descriptors and related indexes, if any), which are created by the indexer 4330. The query parser 4340 can use the domain ontology 4350 for query expansion.

EXAMPLE 56

Exemplary Ontology Creation Techniques

Extraction of accurate domain ontology from design artifacts automatically is a difficult problem. An expert can intervene in the process to improve accuracy and correctness of the domain ontology. When performing ontology creation (e.g., with the system 700 of FIG. 7), the method 800 of FIG. 8 can be used in combination with other techniques.

The search and extraction action 810 for domain ontology elements can involve extraction of keywords from various design artifacts and analysis of the occurrences of the keywords to determine ontology domain concepts. In one embodiment of the technique, there are three main stages: keyword extraction, ontology creation, and refinement by domain experts. In addition to the design artifacts 720A-N, source code can be used. The source code can be the source code to be searched or source code from the same problem domain.

Stage one involves keyword extraction. In this stage, keywords are extracted from various artifacts (e.g., 720A-N) and filtered out to get a set of meaningful keywords.

First, extract keywords are extracted from specific parts of the source code such as function or method names, return types, arguments, comments associated with a function or method, class name, data structure, source code file name and so on. The keywords can be extracted from the abstract syntax tree created from a set of source codes. The abstract syntax tree can be an intermediate data structure created by compilers or by fact extractors. This set of keywords can be denoted as CODEKEYWD.

If other design documents such as use case documents, architecture documents, or the like are available, keywords can be extracted from these documents using text processing techniques. This set of keywords can be denoted as DOCKEYWD.

Then, filtering can be applied to identify meaningful keywords. The set of keywords that are common to the two set of keywords CODEKEYWD and DOCKEYWD can be found. The common set of keywords be denoted as CODEDOCKEYWD.

A keyword relationship from the source code structure can be created using the following rules:

RULE A: If two keywords k1 and k2 in CODEDOCKEYWD occur in a function (or method) names f1 and f2, and f1 calls f2, define a "USES" relationship between k1 and k2.

RULE B: If two keywords k1 and k2 in CODEDOCKEYWD occur in a function (or method) name and a data-structure/class/variable name f1 and v1, and f1 uses v1, define a "HAS-A" relationship between k1 and k2

RULE C: If two keyword k1 and k2 in CODEDOCKEYWD occur in data-structure/class/variable name v1 and v2, and v1 uses v2, define a "HAS-A" relationship between k1 and k2

Stage two involves Ontology creation. The tool can analyze various models (if available) and extract domain concepts for the ontology. The technique can assume the existence of models (UML Models, ER Models, and the like) for extracting the basic ontology elements. Specifically, and ER model is a good candidate to obtain ontology entities. For the models, a set of heuristic rules can be defined to extract ontology domain concepts. In one embodiment of the present technique, the following rules are applied for an ER model:

RULE 1: If the entity relationship model of the source code is available, treat entities in the ER model as domain concepts. The relationships among ER entities can be modeled as a "HAS-A" relationship.

RULE 2: For domain concepts obtained from the ER model, find out if the concept matches (e.g., partial match is allowed) one or more keyword in the set CODEDOCK-EYWD. The similarity can be calculated by string matching techniques. Once this matching is obtained, an Ontology-Keyword association table as shown in Table 5 can be constructed:

TABLE 5

Ontology-Keyword Association

| Ontology entity (e.g., domain concept) | Component |
|---|---|
| Ontology entity 1 | keyword1, keyword2, keyword3, ... |
| Ontology entity 2: | keyword4, keyword5, ... |
| ... | ... |

RULE 3: If a keyword associated with one domain concept is related through a USES or a HAS-A relationship to another keyword associated with another domain concept, define a USES or HAS-A relationship between the domain concepts.

In a similar manner, if a use case document is also available, the heuristic rule (step 1) could be extraction of nouns in the use case document and nouns can be treated as a candidate domain concepts.

Stage 3 can involve a review by domain experts. The domain ontology created by the process can be viewed by an expert to verify the relationships, create synonyms for entities that have different names but mean the same. For example "customer" in the Use case document is the same are "User" in the design document and "user" in the ER model. The expert can refine the domain ontology that may used in the process of creating code semantics descriptors.

EXAMPLE 57

Exemplary Mapping Techniques

In one embodiment of the technologies, mapping between source code elements and domain concepts can be performed as follows:

Use an Ontology-Keyword association table (e.g., Table 5) and count the frequency of occurrence of the keywords in the source code elements. Once the frequency count is over, a frequency matrix can be obtained, where a row in the matrix denotes a source code element, and a column denotes a domain concept. An element of the matrix, FREQ[e,c] denotes the frequency of occurrences of the domain concept c in the source code element e.

For each source code element, find the domain concept that matches the most for a given source code element. To find out the domain concept that matches most for a given source code element e, one possible approach is to consider the row e of the matrix and take the column for which the frequency is maximum in the row.

Map the found domain concept to the appropriate source code element.

User assistance may be required to resolve some mappings.

EXAMPLE 58

Exemplary Additional Features

In any of the examples described herein, the source code can be related to application-domain specific code semantics descriptors that capture the intent of a source code unit. The descriptors can be linked to the source code and used during indexing, search, and retrieval of the source code units. The technologies can improve the accuracy of the results of a search on source code.

EXAMPLE 59

Exemplary Validation

In order to validate the efficacy of the approach, a rudimentary ontology of an e-commerce system was implemented according to the technologies described herein. A Java based application implementing a pet store application was mapped to the ontology.

The Apache Lucene search engine was used, and a new query parser was added to accommodate query expansion using the ontology. The Protégé ontology editor of Stanford University was used to edit, store and access the ontology. The relevance of the results was evaluated for five queries on the pet store application source code files.

Figure 44:
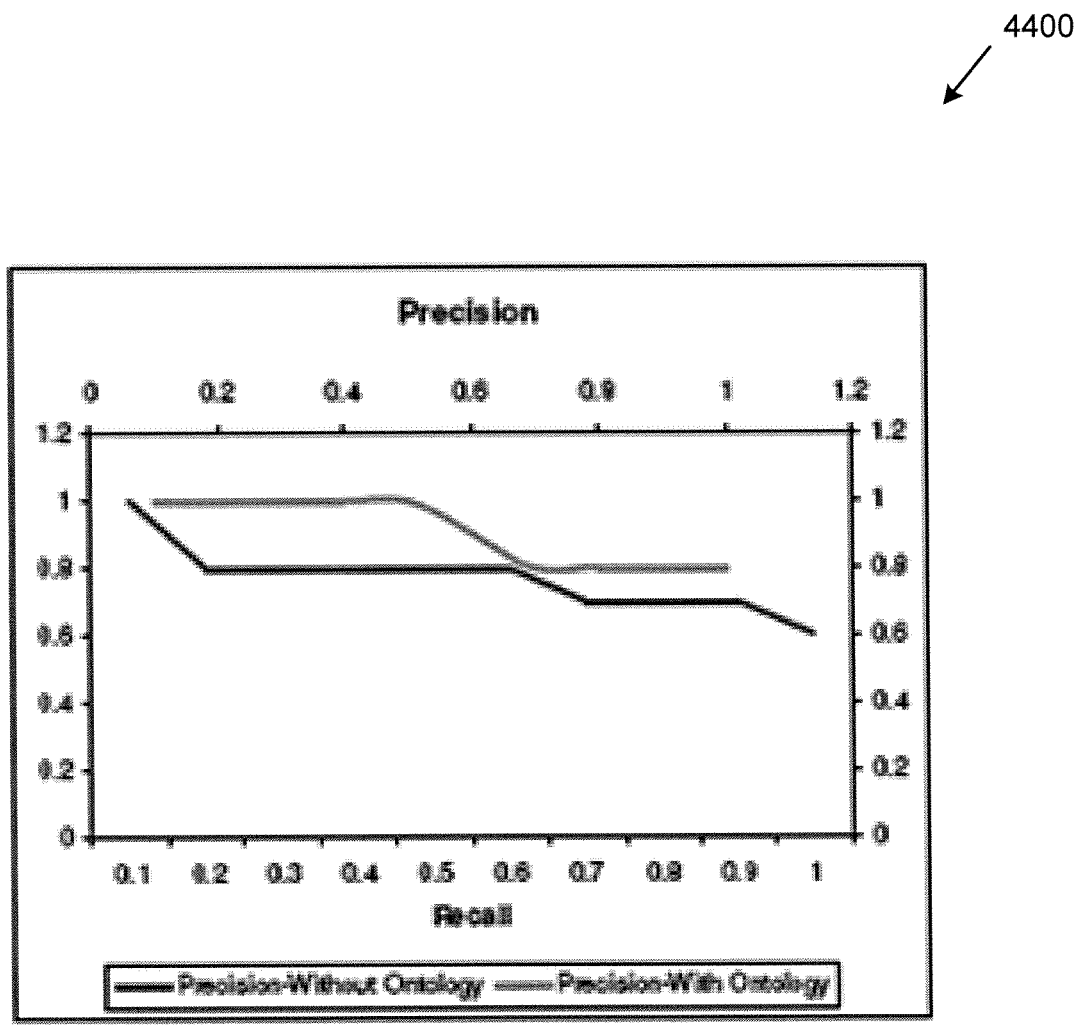
FIG. 44 is a graph showing a precision-recall graph for a pet store application.

For purposes of evaluation, a precision-recall computation was performed on the results. The average precision and recall was computed for over five queries for twenty documents. The results 4400 are shown in FIG. 44. The number of relevant documents retrieved was higher with the use of the ontology (the top line). Hence, the precision was higher when the same number of documents was evaluated. Precision and recall values were computed for the first 20 retrieved results. It was also observed that the results improved when related terms were used in the query as compared to isolated query terms because the relationships impacted the weights of related terms during query expansion.

The quality of the ontology played a key role in result quality. The results had no improvement when the term queried did not have any associations or inheritance relationships.

EXAMPLE 60

Exemplary Advantages

The usefulness of the technologies described herein can become prominent when applied to a large code base. For example, the techniques can improve the understandability, manageability, and maintainability of the source code.

It helps a developer better understand the code if it is possible to query for a source code unit that "creates lineitem" or "reads products."

If the source code is treated as a plain text document without semantic-based querying technologies, the resulting search mechanism is restricted to programming language constructs and keywords rather than the domain functionality of the code. When a developer wishes to find information about the source code, a user can submit a set of keywords to a search engine. However, the existence of the keywords does not necessarily correlate to the intent of the source code.

The technologies described herein can assist with programmer induction and program learning. For example, programmers can be more easily inducted into the programming team due to being able to more easily learn the code. A programmer can ask "Where are invoices updated?" The code semantic descriptors can be studied to better comprehend the code. End-to-end requirements/design/code/test navigation can be implemented by navigating to related artifacts via clicking on concept names that appear in the documents and programs.

The technologies described herein can assist with program reviews and defect prevention. For example, hints can be given for consistent use of variable names (e.g., SubmitPO, SubmitOrder, CreatePurchaseOrder). Hints can be provided on use of standard verbs and nouns as documents in the ontology or domain standards. Discrepancies in code logic can be detected (e.g., in the savings account opening method, a welcome mail is sent, but not in the checking account opening method). Constraints can be enforced in programming (e.g., validation of a credit limit step is required for loan creation).

The technologies described herein can assist in traceability and impact analysis. When maintaining an application, impact of a change can be better assessed. Suspect program can be identified based on the domain concepts they change. An assessment of an impact range (e.g., high, medium, low) can be done based on the number of concepts used in a program.

The technologies described herein can assist in identification and removal of defects. Troubleshooting can be eased. For example, the source code can be queried to identify locations of bugs (e.g., where is the invoice number reset?). The rationale for given code can be understood and traced (e.g., Where is the requirement that Invoice number has to be reset each year?). Root cause analysis can be performed to understand why a bug was not detected (e.g., What test-cases test for resetting of the invoice number?).

The technologies described herein can assist in unit testing and functional testing. For example, effectiveness of testing can be improved. Querying can analyze unit test programs and find out if concepts are adequately covered based on code concept density. For example, an invoice matching application should have a major part of test-cases having the concept "invoice." Consistencies in test-cases in similar modules can be brought about. For example, a savings account and checking account modules should have similar test cases. A functional test-case suite can be analyzed to check adequate coverage of concepts.

The technologies described herein can assist in module distribution and integration. For example, word can be distributed to different multi-location teams and the work can be merged. Mechanisms for distributing the work can be created. For example, concept clusters can be created to decide work boundaries and give cohesive work to the teams). Semantic errors in interface usage can be identified (e.g., re-initialization of a variable in a called module).

The technologies described herein can assist in re-factoring and re-modularization of code. Concept-clusters can be created that may be used to partition source code to derive modules.

The technologies described herein can assist in appreciating outsourcing. Applications that need to be understood in-depth can be identified, and program understanding can be achieved in the absence of adequate documentation. A list of the most referred or most volatile concepts or code segments can be used to prioritize appreciation activity. The domain ontology and code semantic descriptors can be used to understand the code concepts and behavior, leading to better code comprehension.

The technologies described herein can assist in program analysis reports. A Create-Read0Update-Delete report of concepts against program files can be generated. A functional view of code can be provided for a given use-case. Text can be generated to describe how a use-case is implemented in functional terms without getting into details of classes and methods.

EXAMPLE 61

Exemplary Computing Environment

Figure 45:
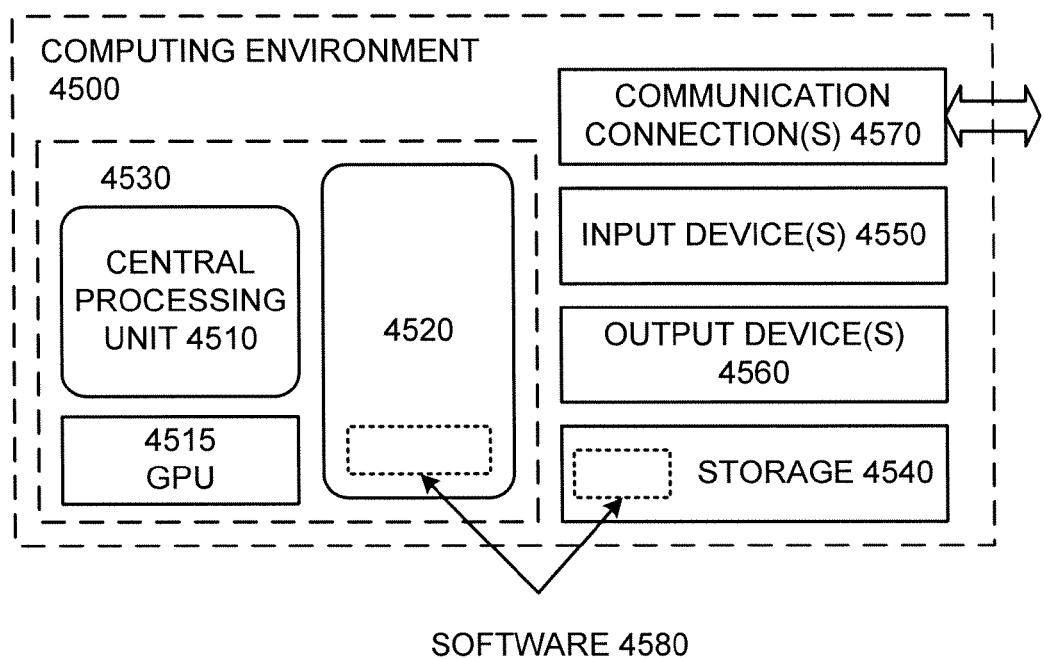
FIG. 45 is a block diagram of an exemplary suitable computing environment for implementing any of the technologies described herein.

FIG. 45 illustrates a generalized example of a suitable computing environment 4500 in which the described techniques can be implemented. The computing environment 4500 is not intended to suggest any limitation as to scope of use or functionality, as the technologies may be implemented in diverse general-purpose or special-purpose computing environments.

With reference to FIG. 45, the computing environment 4500 includes at least one processing unit 4510 and memory 4520. In FIG. 45, this most basic configuration 4530 is included within a dashed line. The processing unit 4510 executes computer-executable instructions and may be a real or a virtual processor. In a multi-processing system, multiple processing units execute computer-executable instructions to increase processing power. The memory 4520 may be volatile memory (e.g., registers, cache, RAM), non-volatile memory (e.g., ROM, EEPROM, flash memory, etc.), or some combination of the two. The memory 4520 can store software 4580 implementing any of the technologies described herein.

A computing environment may have additional features. For example, the computing environment 4500 includes storage 4540, one or more input devices 4550, one or more output devices 4560, and one or more communication connections 4570. An interconnection mechanism (not shown) such as a bus, controller, or network interconnects the components of the computing environment 4500. Typically, operating system software (not shown) provides an operating environment for other software executing in the computing environment 4500, and coordinates activities of the components of the computing environment 4500.

The storage 4540 may be removable or non-removable, and includes magnetic disks, magnetic tapes or cassettes, CD-ROMs, CD-RWs, DVDs, or any other computer-readable media which can be used to store information and which can be accessed within the computing environment 4500. The storage 4540 can store software 4580 containing instructions for any of the technologies described herein.

The input device(s) 4550 may be a touch input device such as a keyboard, mouse, pen, or trackball, a voice input device, a scanning device, or another device that provides input to the computing environment 4500. For audio, the input device(s) 4550 may be a sound card or similar device that accepts audio input in analog or digital form, or a CD-ROM reader that provides audio samples to the computing environment. The output device(s) 4560 may be a display, printer, speaker, CD-writer, or another device that provides output from the computing environment 4500.

The communication connection(s) 4570 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Readable Media

Any of the methods described herein can be implemented by computer-executable instructions in one or more computer-readable media (e.g., computer-readable storage media).

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. A method comprising:
   receiving a query for software source code, wherein the query comprises one or more queried domain concept names, wherein at least one of the one or more queried domain concept names is indicated as prohibited;
   processing the query, wherein the processing comprises:
      expanding the query to include one or more query terms with relationships to the one or more queried domain concept names based on an ontology, wherein at least one of the one or more query terms is indicated as prohibited at least based on at least one of the relationships to the one or more queried domain concept names, the at least one of the relationships being with the at least one of the one or more domain concept names indicated as prohibited;
      based on the relationships to the one or more queried domain concept names based on the ontology, assigning weights to the one or more query terms;
      if two domain concept names of the one or more queried domain concept names are indicated as both prohibited and required due to the expansion, the domain concept name with the greater weight is favored;
      if the two domain concept names have equal weights, the domain concept name indicated as prohibited is favored;
      finding where, within the software source code, one or more source code element names mapped to the one or more queried domain concept names appear; and
      displaying results of the query.

2. The method of claim 1 wherein: the query comprises one or more respective operations for the one or more queried domain concept names; and the processing comprises finding where within the software source code the one or more respective operations are performed on one or more source code element names mapped to the one or more queried domain concept names.

3. The method of claim 2 wherein finding where within the source code the one or more respective operations are performed comprises:
   finding where within the source code the one or more respective operations are performed on variables in the source code that are of a type indicated by a source code element name mapped to the one or more queried domain concept names.

4. The method of claim 2 wherein:
   the results indicate a description of the one or more respective operations performed for the one or more source code element names mapped to the one or more queried domain concept names.

5. The method of claim 2 wherein:
   the results comprise a list of hit entries indicating respective locations in the source code where the one or more respective operations are performed on one or more source code element names mapped to the one or more queried domain concept names.

6. The method of claim 2 wherein:
   the results comprise a list of methods in the source code within which the one or more respective operations are performed on one or more source code element names mapped to the one or more queried domain concept names.

7. The method of claim 2 wherein:
   the results comprise a hyperlink to a location in the source code within which the one or more respective operations are performed on one or more source code element names mapped to the one or more queried domain concept names.

8. The method of claim 1 wherein:
   the processing avoids finding source code units in which source code elements mapped to the at least one of the one or more domain concept names indicated as prohibited appear.

9. The method of claim 1 wherein:
   the processing searches a plurality of code semantics descriptors for respective source code units, wherein the code semantics descriptors describe source code elements in the source code units in terms of domain concepts.

10. The method of claim 9 wherein:
    the processing searches the plurality of code semantics descriptors via an index of the plurality of code semantics descriptors.

11. One or more non-transitory computer-readable storage media having computer-executable instructions for performing a method, the method comprising:

receiving a query for software source code, wherein the query comprises one or more queried domain concept names, wherein at least one of the one or more domain concept names is indicated as prohibited;

processing the query, wherein the processing comprises:

expanding the query to include one or more query terms with relationships to the one or more queried domain concept names based on an ontology, wherein at least one of the one or more query terms is indicated as prohibited at least based on at least one of the relationships to the one or more queried domain concept names, the at least one of the relationships being with the at least one of the one or more domain concept names indicated as prohibited;

assigning weights to the one or more query terms based on the relationships to the one or more queried domain concept names based on the ontology;

if two domain concept names of the one or more queried domain concept names are indicated as both prohibited and required due to the expansion, the domain concept name with the greater weight is favored;

if the two domain concept names have equal weights, the domain concept name indicated as prohibited is favored;

finding where, within the software source code, one or more source code element names mapped to the one or more queried domain concept names appear; and displaying results of the query.

12. The one or more computer-readable storage media of claim 11 further having encoded thereon a data structure comprising:

a description of operations performed, within a unit of source code, on respective source code elements mapped to domain concept names, wherein the description uses respective domain concept names in place of names of the source code elements;

a link to a location within the source code indicating where, within the source code, the source code unit within which the operations are performed appears, the link comprising a file name in which the source code unit appears and a starting line number of the source code unit.

13. The one or more computer-readable media of claim 12 wherein:

the source code unit is a method defined in an object class; and the link indicates where within the source code the method appears.

14. The one or more computer-readable media of claim 12 wherein:

the description of operations performed comprises at least one chosen from a group consisting of the following:

a description of a read operation performed on a source code element in the unit of source code;

a description of a create operation performed on a source code element in the unit of source code;

a description of an update operation performed on a source code element in the unit of source code; and a description of a delete operation performed on a source code element in the unit of source code.

15. A computer-implemented method of searching software source code, the method comprising:

receiving a query for the software source code, wherein the query comprises one or more domain concepts, wherein at least one of the one or more domain concepts is indicated as prohibited;

processing the query against the software source code, the processing comprising:

expanding the query to include one or more query terms with relationships to the one or more domain concepts based on an ontology, wherein at least one of the one or more query terms is indicated as prohibited at least based on at least one of the relationships to the one or more queried domain concepts, the at least one of the relationships being with the at least one of the one or more domain concept names indicated as prohibited;

assigning query term weights based on the relationships to the one or more domain concepts based on the ontology;

if two domain concepts of the one or more queried domain concepts are indicated as both prohibited and required due to the expansion, the domain concept with the greater weight is favored;

if the two domain concepts have equal weights, the domain concept indicated as prohibited is favored; and providing results of the processing; wherein the results indicate a description of one or more operations performed in the software source code on one or more source code elements mapped to respective domain concepts of the query.

16. The method of claim 15 wherein:

a plurality of descriptors are associated with respective methods appearing in the source code; and the operations described in the descriptors are performed within the respective methods associated with the descriptors.

17. The method of claim 15 wherein:

the query comprises at least one domain concept;

the results indicate at least one instance within the source code at which a source code element associated with the at least one domain concept appears;

the method further comprising:

displaying a characterization of how the source code element associated with the domain concept is utilized in the at least one instance.

18. A computer-implemented method of searching software source code, the method comprising:

receiving a query for the software source code, wherein the query comprises one or more queried domain concept names and one or more respective operations for the domain concept names, wherein one or more respective source code element names appearing in the software source code are mapped to the one or more queried domain concept names, and wherein at least one of the one or more domain concept names is indicated as prohibited;

processing the query, wherein the processing comprises:

expanding the query to include one or more query terms with relationships to the one or more queried domain concept names based on an ontology, wherein at least one of the one or more query terms is indicated as prohibited at least based on at least one of the relationships to the one or more queried domain concept names, the at least one of the relationships being with the at least one of the one or more domain concept names indicated as prohibited;

assigning a weight to at least one of the one or more query terms based on the relationship between the at least one of the one or more query terms and the related one or more queried domain concept names based on the ontology;

if two domain concept names of the one or more queried domain concept names are indicated as both prohibited and required due to the expansion, the domain concept name with the greater weight is favored;
if the two domain concept names have equal weights, the domain concept name indicated as prohibited is favored; and
finding where, within the software source code, there are occurrences of the source code element names that are mapped to the one or more queried domain concept names in which the one or more respective operations are performed on the one or more source code element names; and
providing results of processing the query.

19. The method of claim 18 wherein: source code elements appearing in the source code are mapped to respective domain concepts of the one or more queried domain concepts; and a plurality of source code semantic descriptors describe operations performed on source code elements in terms of the one or more queried domain concepts; and the finding comprises finding, in the code semantic descriptors, occurrences of the one or more operations performed on the respective domain concepts.

20. A query processing system comprising:
at least one processor; and
memory comprising computer-executable instructions for performing a method, the method comprising:
  receiving a query for software source code, wherein the query comprises one or more queried domain concept names, wherein at least one of the one or more domain concept names is indicated as prohibited;
  processing the query, wherein the processing comprises:
    expanding the query to include one or more query terms with relationships to the one or more queried domain concept names based on an ontology, wherein at least one of the one or more query terms is indicated as prohibited at least based on at least one of the relationships to the one or more queried domain concept names, the at least one of the relationships being with the at least one of the one or more domain concept names indicated as prohibited;
    assigning weights to the one or more query terms based on the relationships to the one or more queried domain concept names and weights of the one or more queried domain concept names based on the ontology;
    if two domain concept names of the one or more queried domain concept names are indicated as both prohibited and required due to the expansion, the domain concept name with the greater weight is favored;
    if the two domain concept names have equal weights, the domain concept name indicated as prohibited is favored; and
    finding where, within the software source code, one or more source code element names mapped to the one or more queried domain concept names appear; and
  displaying results of the query.

21. A method comprising:
generating a plurality of code semantic descriptors from source code, wherein the code semantic descriptors indicate operations performed in the source code on source code elements in the source code that are mapped to respective domain concepts stored in an ontology, wherein the code semantic descriptors indicate the operations performed on the source code elements in the source code in terms of the respective domain concepts to which the source code elements are mapped, wherein the code semantic descriptors indicate operations performed in respective methods of the source code; wherein the ontology is a domain-specific ontology tailored to a problem domain within which an application of which the source code is a part falls;
receiving a query, wherein the query specifies one or more domain concepts and respective operations performable on the one or more domain concepts, wherein at least one of the one or more domain concepts is indicated as prohibited by a Boolean operator;
processing the query, wherein the processing the query comprises:
  weighting the one or more domain concepts, the weighting comprising applying a weight to the at least one of the one or more domain concepts indicated as prohibited;
  expanding the query to include one or more query terms with relationships to the one or more queried domain concepts based on an ontology, wherein at least one of the one or more query terms is indicated as prohibited at least based on at least one of the relationships to the one or more queried domain concepts and the weight of the at least one of the one or more domain concepts indicated as prohibited, the at least one of the relationships being with the at least one of the one or more domain concepts indicated as prohibited;
  based on the relationships to the one or more queried domain concepts based on the ontology, assigning weights to the one or more query terms;
  if two domain concepts of the one or more queried domain concepts are indicated as both prohibited and required due to the expansion, the domain concept with the greater weight is favored:
  if the two domain concepts have equal weights, the domain concept indicated as prohibited is favored;
  processing the expanded query against the plurality of code semantic descriptors, the processing the expanded query identifying which methods in the source code contain occurrences of the domain concepts specified in the query in which the respective operations are performed on the domain concepts specified in the query; and
displaying results of the query, wherein the results comprise an indication of which methods in the source code contain occurrences of the domain concepts specified in the query in which the respective operations are performed on the domain concepts specified in the query.

* * * * *